(12) United States Patent
Raimondi et al.

(10) Patent No.: US 12,037,929 B2
(45) Date of Patent: Jul. 16, 2024

(54) METAL STAMPED SWITCHING ROLLER FINGER FOLLOWER

(71) Applicant: Eaton Intelligent Power Limited, Dublin (IE)

(72) Inventors: Emanuele Raimondi, Turin (IT); Massimo D'Amore, Turin (IT); Jeffrey R. Brown, Marshall, MI (US); Ramy Rezkalla, Kalamazoo, MI (US); Matthew A. Vance, Kalamazoo, MI (US); Andrei D. Radulescu, Marshall, MI (US); Brandon J. Elliott, Ceresco, MI (US)

(73) Assignee: Eaton Intelligent Power Limited, Dublin (IE)

( * ) Notice: Subject to any disclaimer, the term of this patent is extended or adjusted under 35 U.S.C. 154(b) by 305 days.

(21) Appl. No.: 17/613,667

(22) PCT Filed: May 22, 2020

(86) PCT No.: PCT/EP2020/025241
§ 371 (c)(1),
(2) Date: Nov. 23, 2021

(87) PCT Pub. No.: WO2020/239259
PCT Pub. Date: Dec. 3, 2020

(65) Prior Publication Data
US 2022/0228516 A1 Jul. 21, 2022

Related U.S. Application Data

(60) Provisional application No. 62/852,682, filed on May 24, 2019.

(51) Int. Cl.
*F01L 1/18* (2006.01)
*F01L 13/00* (2006.01)
*F01L 1/46* (2006.01)

(52) U.S. Cl.
CPC .......... *F01L 1/185* (2013.01); *F01L 13/0005* (2013.01); *F01L 13/0036* (2013.01);
(Continued)

(58) Field of Classification Search
CPC ....... F01L 1/185; F01L 2001/186; F01L 1/46; F01L 2001/467; F01L 13/0005;
(Continued)

(56) References Cited

U.S. PATENT DOCUMENTS

| 2001/0045197 A1 | 11/2001 | Fernandez et al. |
| 2011/0197843 A1 | 8/2011 | Manther |

(Continued)

FOREIGN PATENT DOCUMENTS

| CN | 201539284 U | 8/2010 |
| CN | 102619582 A | 8/2012 |

(Continued)

OTHER PUBLICATIONS

International Search Report and Written Opinion for PCT/EP2020/025241; mailed Sep. 17, 2020; pp. 1-11.

*Primary Examiner* — Jorge L Leon, Jr.
(74) *Attorney, Agent, or Firm* — Pearne & Gordon LLP

(57) ABSTRACT

A switching roller finger follower (SRFF) for valve actuation includes an outer arm (16), a first inner arm (12), a bearing axle (50) and a latch pin (26). The outer arm (16) is formed of a metal stamping, and is pivotally coupled to a main axle (40). The first inner arm (12) is coupled to the main axle (40) and is pivotably secure to the outer arm. The bearing axle (50) extends through the outer arm and the first inner arm. The bearing axle supports a roller (20) thereon. The latch pin (26) is slidably disposed in the outer arm (16) and is movable between at least a first position where the outer arm (16) and the first inner arm (12) are coupled for concurrent rotation and a second position wherein one of the outer arm and the first inner arm are configured to rotate relative to the other arm.

18 Claims, 21 Drawing Sheets

(52) U.S. Cl.
CPC ............ *F01L 2001/186* (2013.01); *F01L 1/46* (2013.01); *F01L 2001/467* (2013.01); *F01L 2013/001* (2013.01); *F01L 2301/00* (2020.05); *F01L 2303/00* (2020.05); *F01L 2305/02* (2020.05)

(58) Field of Classification Search
CPC ............. F01L 2013/001; F01L 2301/00; F01L 2303/00; F01L 2305/02
USPC ................................ 123/90.39, 90.41, 90.44
See application file for complete search history.

(56) References Cited

U.S. PATENT DOCUMENTS

| | | |
|---|---|---|
| 2012/0097123 A1 | 4/2012 | Schulze et al. |
| 2015/0128890 A1 | 5/2015 | Cecur |
| 2015/0371793 A1 | 12/2015 | Sheren et al. |
| 2016/0273413 A1 | 9/2016 | Sheren et al. |
| 2018/0163576 A1 | 6/2018 | Sheren et al. |
| 2018/0306073 A1 * | 10/2018 | McCarthy, Jr. ........... F01L 1/08 |
| 2019/0063268 A1 * | 2/2019 | Buonocore ......... F01L 13/0005 |
| 2020/0131947 A1 | 4/2020 | Cecur |

FOREIGN PATENT DOCUMENTS

| | | | |
|---|---|---|---|
| CN | 203783669 U | 8/2014 | |
| CN | 205578056 U | 9/2016 | |
| CN | 107355275 A | 11/2017 | |
| DE | 102015221011 A1 * | 7/2016 | |
| DE | 102015221011 A1 | 7/2016 | |
| DE | 102017103578 A1 | 8/2018 | |
| WO | 2014071373 A1 | 5/2014 | |
| WO | 2015134466 A1 | 9/2015 | |
| WO | 2019008183 A1 | 1/2019 | |
| WO | WO-2019008183 A1 * | 1/2019 | .............. F01L 1/182 |

* cited by examiner

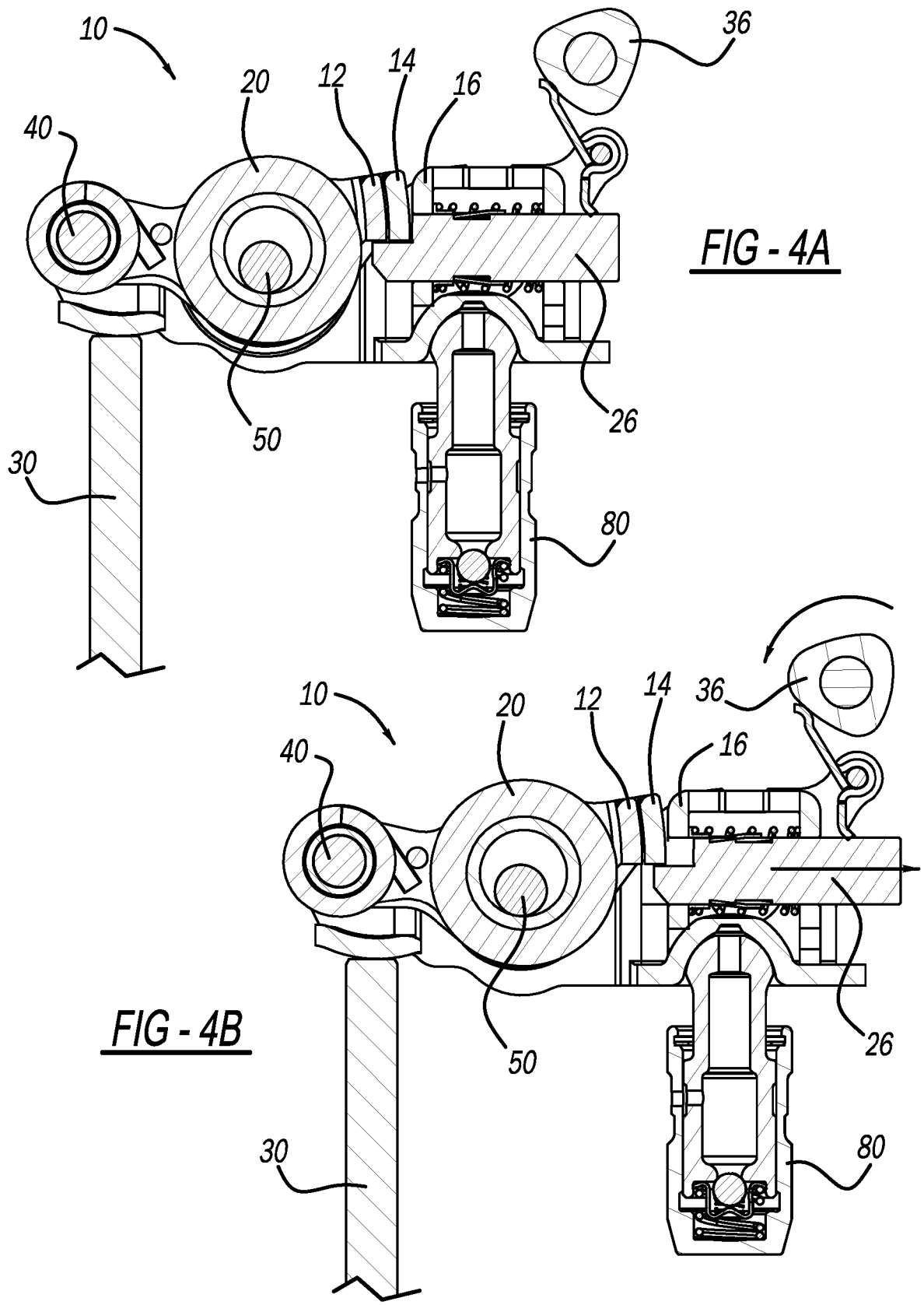

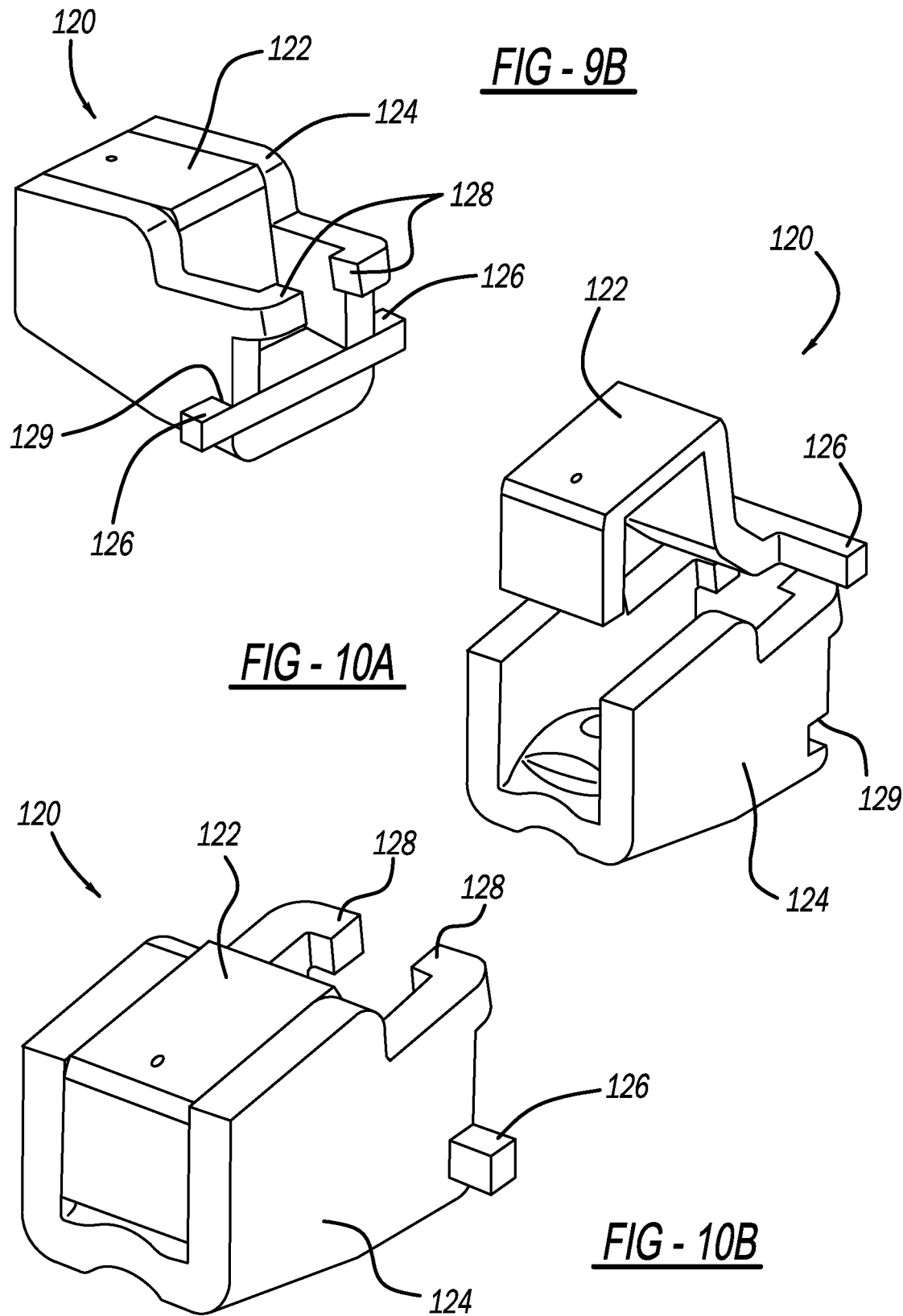

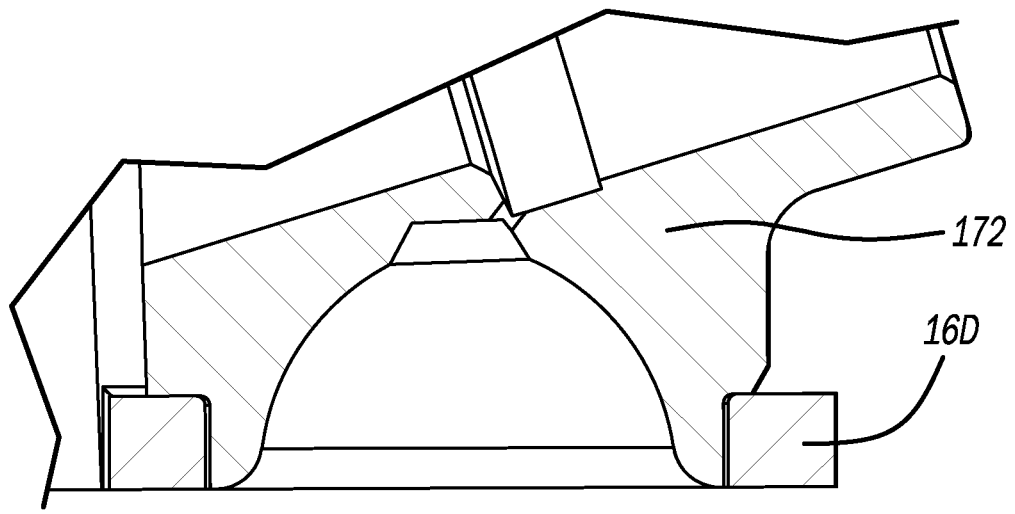
FIG - 27B
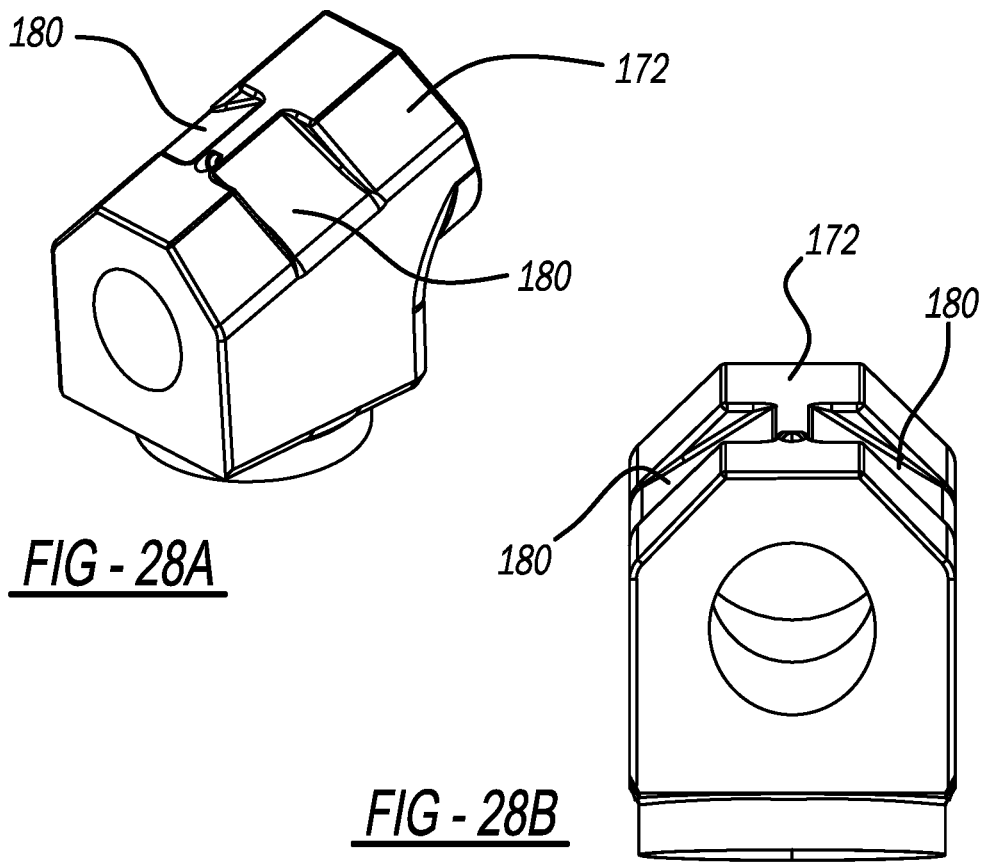
FIG - 28A
FIG - 28B

METAL STAMPED SWITCHING ROLLER FINGER FOLLOWER

This is a United States § 371 National Stage application of PCT/EP2020/025241 filed May 22, 2020, which claims the benefit of U.S. provisional application No. 62/852,682 filed May 24, 2019 all of which are incorporated herein by reference.

FIELD

This application relates to switching roller finger followers and more specifically to a switching roller finger follower having metal stamped outer arms.

BACKGROUND

Switching rocker arms allow for control of valve actuation by alternating between two or more states, usually involving multiple arms, such as in inner arm and outer arm. In some circumstances, these arms engage different cam lobes, such as low-lift lobes, high-lift lobes, and no-lift lobes. Mechanisms are required for switching rocker arm modes in a manner suited for operation of internal combustion engines.

Variable valve actuation refers to manipulating the timing of valve action with respect to engine cylinders. A cylinder of an engine has a reciprocating piston. An intake valve controls when the cylinder is open to intake a charge, and an exhaust valve controls when the cylinder is open to exhaust a spent charge. Techniques include early intake valve closing (EIVC) and late intake valve closing (LIVC). "Early" and "Late" are with respect to a normal Otto cycle valve closing timing, which is near bottom dead center of piston travel.

Another technique deactivates the valve motion altogether, resulting in a "lost motion." Examples of mechanisms for cylinder deactivation can be seen in WO 2014/071373, and related applications, assigned to the present applicant. The mechanisms of WO 2014/071373 are used for implementing either a valve lift event or a cylinder deactivation event. The rocker arm can either actuate a valve, or accommodate "lost motion" during a cylinder deactivation event.

In some examples manufacturing of such switching roller finger followers can be expensive.

SUMMARY

A switching roller finger follower (SRFF) for valve actuation includes an outer arm, a first inner arm, a bearing axle and a latch pin. The outer arm is formed of a metal stamping. The outer arm is pivotally coupled to a main axle. The first inner arm is coupled to the main axle and is pivotably secure to the outer arm. The bearing axle extends through the outer arm and the first inner arm. The bearing axle supports a roller thereon. The latch pin is slidably disposed in the outer arm and is movable between at least a first position where the outer arm and the first inner arm are coupled for concurrent rotation and a second position wherein one of the outer arm and the first inner arm are configured to rotate relative to the other arm.

According to other feature the SRFF further includes an upper latch cavity member and a lower latch cavity member that is coupled to the upper latch cavity member to form a latch cavity assembly that is coupled to the outer arm. The upper and lower cavity members are formed of metal stamping. The latch cavity assembly is coupled to the outer arm by at least one of welding, chemical bonding and riveting. The upper and lower latch cavity members are coupled together by at least one of welding, brazing, bonding and staking.

In other features the SRFF further includes an axle pin that is received by complementary holes formed in the outer arm and the latch cavity assembly. The axle pin retains the latch cavity assembly to the outer arm. The axle pin is staked to the outer arm to maintain a fixed position relative to the outer arm. The upper latch cavity member can include outwardly extending protrusions. The lower latch cavity member can define a cavity notch. The cavity notch receives the outwardly extending protrusions. The outer arm defines a rocker arm notch. The outwardly extending protrusions are further received by the rocker arm notch. The outer arm defines integrally formed axles configured to support springs.

According to additional features, the SRFF can include a latch cavity assembly formed of a single stamping. The latch cavity assembly is configured to be coupled to the outer arm. The outer arm further defines a latch housing integrally formed by the metal stamping. The latch housing can comprise box walls that define at least one passage that accommodate the latch pin. In one configuration, the SRRF is a single roller SRFF. The roller supported by the bearing axle is the only roller on the SRFF. The roller is configured to communicate with a single cam. The SRFF can be configured for cylinder deactivation. The SRFF is configured for variable lift. In other configurations, the SRFF further comprises a second inner arm coupled to the main axle and pivotably secured to the outer arm. The first inner arm is configured to control a main lift event through a single roller. The second inner arm has two rollers that control a secondary lift.

A method of forming an outer rocker arm of a switching roller finger follower (SRFF) by stamping is provided. Sheet metal is stamped into a first shape having a rocker arm structure. The stamped sheet metal is located into a fixture where the rocker arm structure is supported at least in two locations. One of the locations comprises a sphere. An insert is located into the rocker arm structure against the sphere. The insert is configured to accommodate a latch. Portions of the rocker arm structure are deflected at least partially over the insert thereby locking the insert relative to the rocker arm structure.

In other features the insert defines pockets thereon. Deflecting portions of the rocker arm structure further comprises deflecting the sheet metal into the pockets. The insert can be further welded to the rocker arm structure subsequent to locating the insert into the rocker arm structure.

BRIEF DESCRIPTION OF THE DRAWINGS

FIG. 4A is a sectional view taken along lines 4A-4A of FIG. 1 and shown with the actuation cams on base radius with the latch pin fully engaged resulting in all bodies latched;

FIG. 4B is a sectional view of the SRFF shown in FIG. 4A and shown with the actuation cam rotating to lower lift and with the latch pin moved to a central position;

FIGS. 9A and 9B are a rear perspective sequence view illustrating assembling of a latch cavity assembly of the SRFF of FIG. 7;

FIGS. 10A and 10B are a front perspective sequence view illustrating assembling of a latch cavity assembly of the SRFF of FIG. 7;

FIG. 27B is a detail view taken around reference 27B of FIG. 27A;

FIG. 28A is a perspective view of the insert of FIG. 26B; and

FIG. 28B is a front perspective view of the insert of FIG. 28A.

DETAILED DESCRIPTION

As will become appreciated from the following discussion the instant disclosure provides various rocker arm configurations incorporating rocker arms that are formed of metal stamping. In some configurations, as shown in FIGS. 7-25, the present disclosure provides a stamped sheet metal single roller cylinder deactivation (CDA) rocker arm. As is known in the art a CDA rocker arm configuration can provide a first mode of operation that converts cam motion into valve lift and a second mode of operation where cam motion is converted to lost motion and no valve lift.

Depending on the configuration, typically a latch or latch pin moves between extended and retracted positions to move between lift and no lift operation. In other configurations, as shown in FIGS. 1-5C, the present disclosure provides a stamped metal sheet roller rocker arm for dual lift and valve deactivation. The stamped construction provides advantages including cost benefits over traditional rocker arms that are formed from casting.

Figure 1:
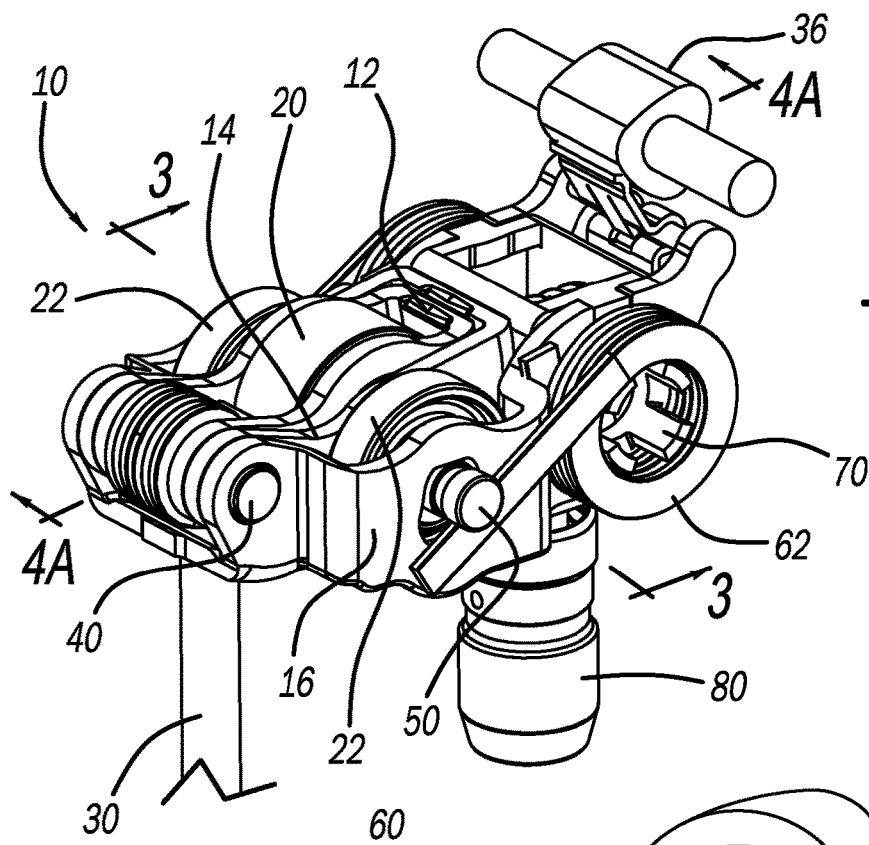
FIG. 1 is a perspective view of a rolling rocker arm (RRA) or switching roller finger follower (SRFF) configured for dual lift and valve deactivation and constructed with a stamped outer arm according to one example of the present disclosure.
Figure 2:
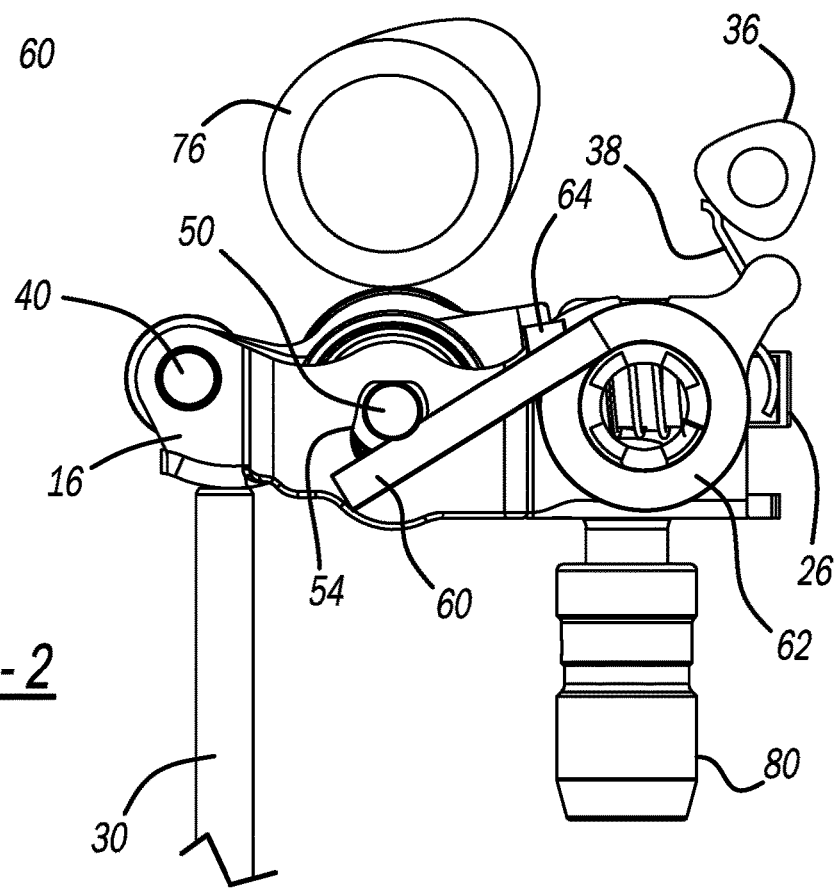
FIG. 2 is a side view of the SRFF of FIG. 1.
Figure 3:
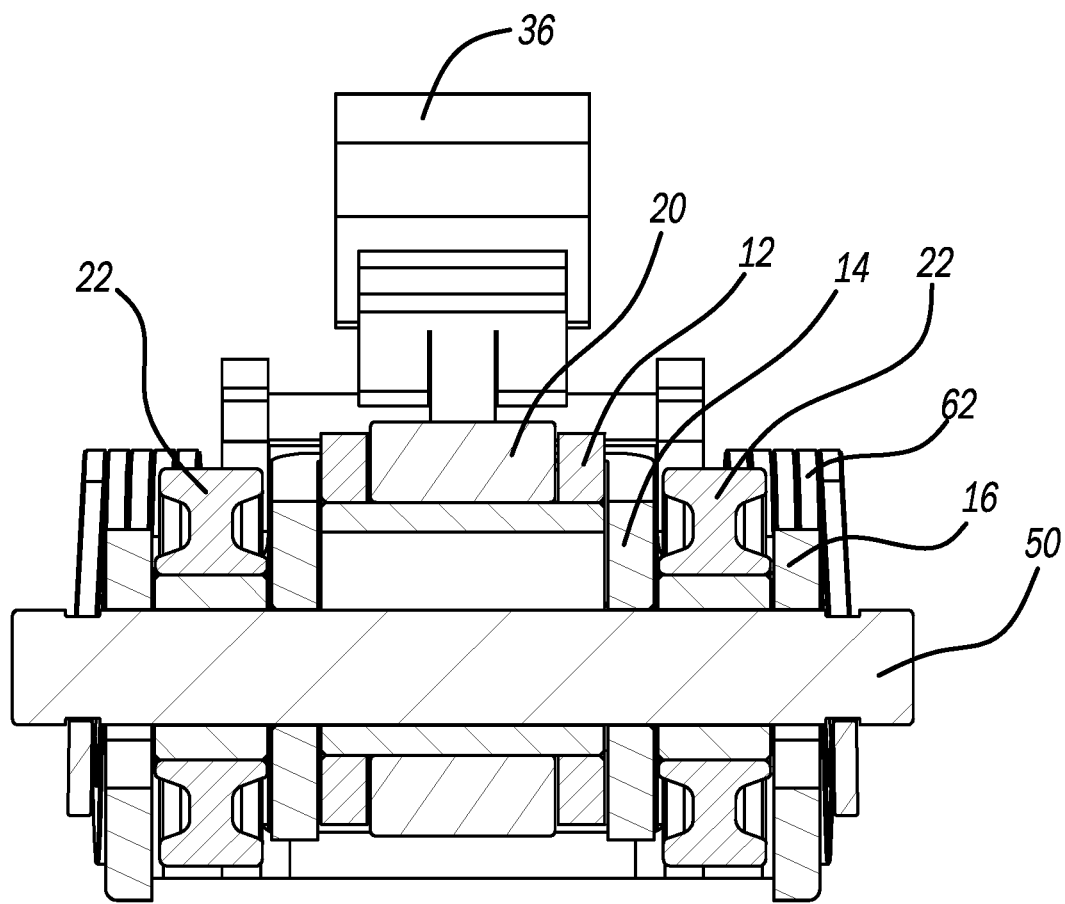
FIG. 3 is a sectional view taken along lines 3-3 of FIG. 1.

With initial reference to FIG. 1, a switching roller finger follower (SRFF) constructed in accordance to one example of the present disclosure is shown and generally identified at reference numeral 10. Combination of variable valve lift (VVL) and valve deactivation capability gives an engine greater flexibility. The SRFF for dual lift and valve deactivation derives from the junction of a VVL SRFF and a deactivating SRFF. The SRFF 10 includes a first inner arm (body) 12, a second inner arm (body) 14 and an outer arm (body) 16. As will be described herein, the outer body 16 is a stamped metal sheet. As will become appreciated herein, prior art outer arms are formed from investment casting, metal injection molding or machined from billet steel. Additional operations such as machining and coining are required to maintain the tight tolerances needed for function. The overall cost of the outer arm is the highest cost contributor of the SRFF. The instant disclosure provides a lower cost outer arm 16 formed from a stamped metal sheet.

Forming an outer arm 16 of a stamped metal sheet provides many advantages. For example, stamped wall thickness can be reduced and 1.5 mm-2.0 mm are sufficient for stiffness or load carrying capacity. Lighter constructions will improve the valvetrain dynamics due to reduction in moment of inertia. Stampings have little or no sub surface defects. In contrast, investment casting and (metal injection molding (MIM) can require inspections to separate unsatisfactory parts.

Surface quality improvements on the wear surfaces of the stamped outer arm 16 are realized. Investment cast requires additional machining or coining operations. A stamped part has the coining and sizing operations in the same tool that forms the part. Previous limitations with similar outer arms with stamped constructions were related to latch cavity and the ability to seal oil in the latch cavity. The instant application offers the following solutions. A sealed latch cavity allows pressurized oil to be directed from the hydraulic lash adjuster to the jet hole to lubricate the bearing. The latch orientation in respect to the gothic and valve pads is flexible allowing the latch to be tilted helping with packaging, inner arm stiffness and antisubmarine issue.

Figure 4C:
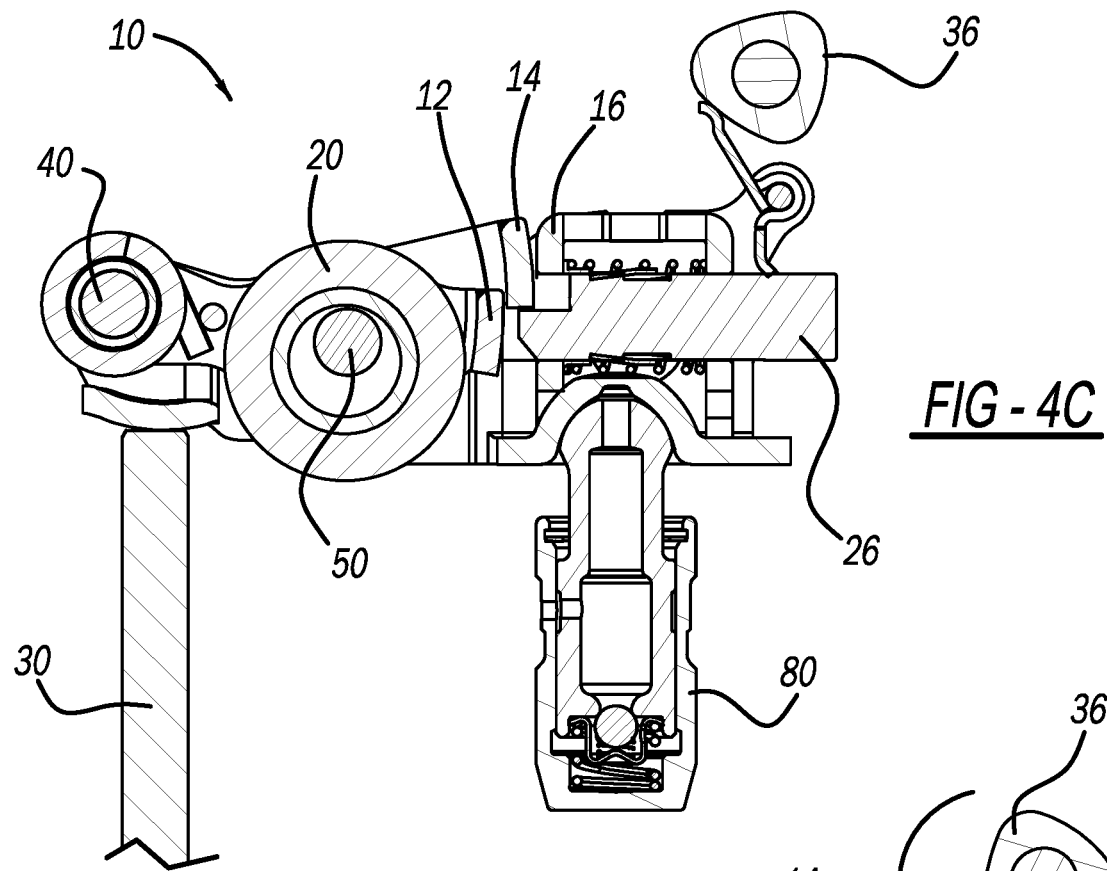
FIG. 4C is a sectional view of the SRFF shown in FIG. 4A and shown during secondary lift where the main lift inner body is disengaged and a secondary lift inner body is engaged
Figure 4D:
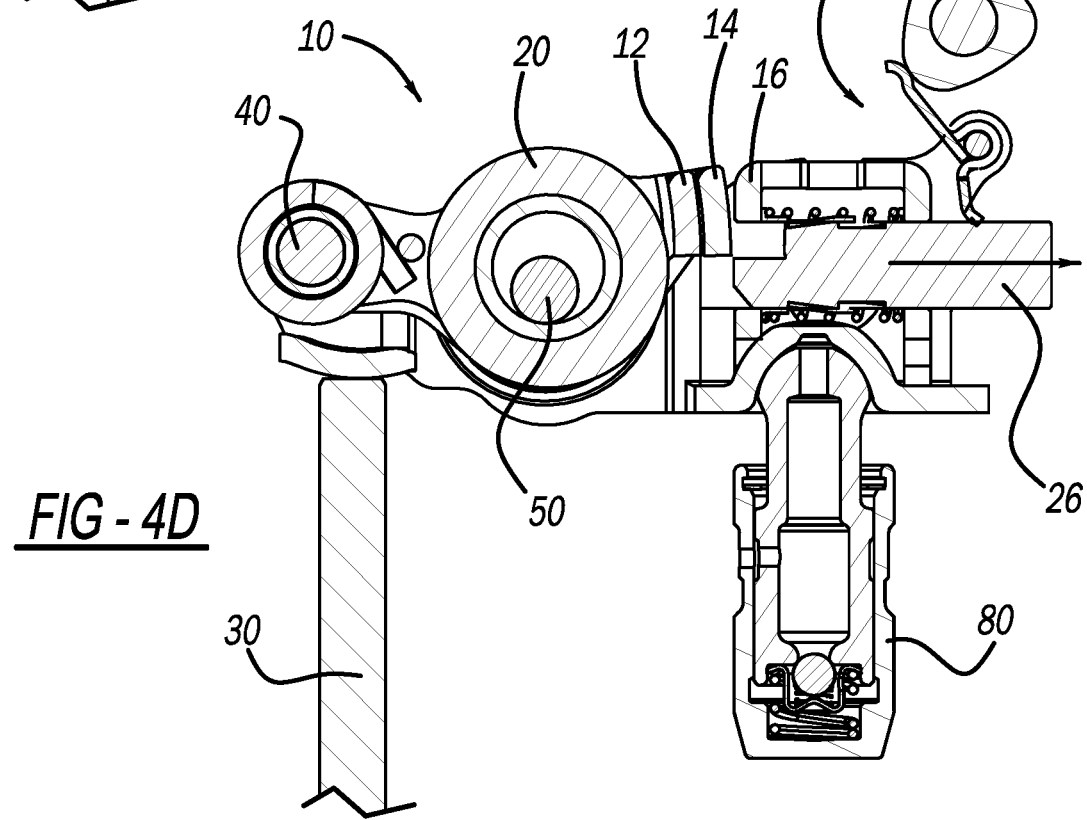
FIG. 4D is a sectional view of the SRFF shown in FIG. 4A and shown with the actuation cam rotated to a higher lift position and the latch pin moved to a fully disengaged position.
Figures 4E, 5A:
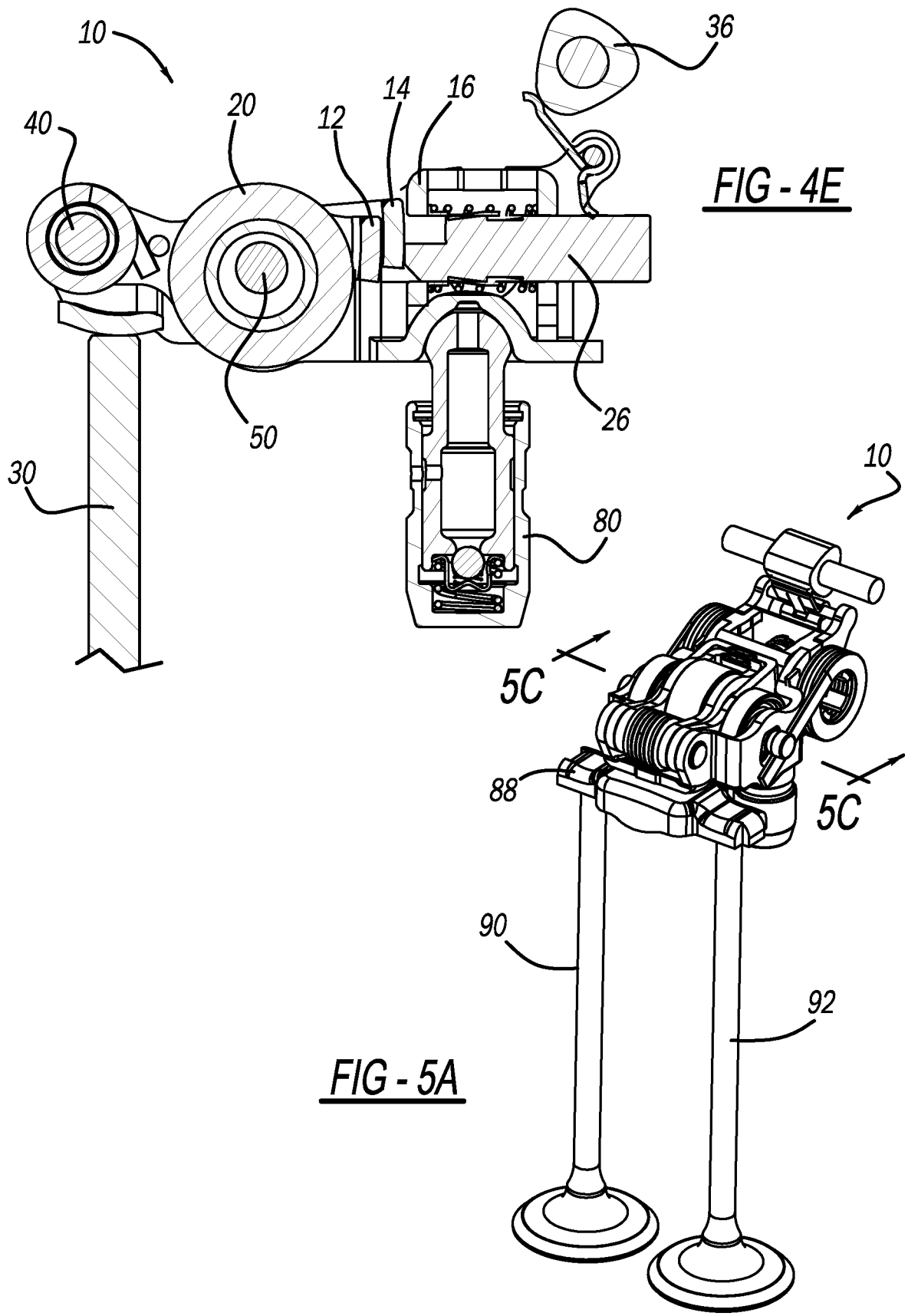
FIG. 4E is a sectional view of the SRFF shown in FIG. 4A and shown during valve deactivation with both inner bodies disengaged.
FIG. 5A illustrates a single RRA cooperating with a valve bridge according to another example of the present disclosure.

The first inner body 12 controls the main lift event through a single (main lift) roller 20. The second inner body 14 has two (secondary lift) rollers 22 controlling the secondary lift. Both of the first and second inner bodies 12 and 14 have a lost motion capacity that can be selected changing the position of a latch pin 26. In normal operation, the latch pin 26 is fully engaged (FIG. 4A) permitting only the main lift (central cam) to open valve 30. Moving the latch pin 26 to an intermediate position (FIGS. 4B and 4C) causes the first inner body 12 to become unlatched. In this condition, only the secondary lift will be operated. Moving again, the latch pin 26 to a fully disengaged position (FIGS. 4D and 4E). In this position, the second inner body 14 will also be unlatched permitting full valve deactivation. Control of the latch pin 26 can be operated by an external control cam 36 acting directly on through a lever system 38 on the latch pin 26. The control cam 36 has three positions including a base radius for standard lift, mid-height for secondary lift and full height for complete unlatching and valve deactivation.

The first and second inner arms 12, 14 are pivotally coupled to the outer body 16 via a main axle 40. The first and second inner arms 12, 14 are coupled to the main lift roller 20 through a bearing axle 50. The bearing axle 50 can protrude through a slot 54 defined through the outer body 16. The bearing axle 50 can include a "dog bone" shape to catch against a spring arm first end 60 of a spring 62. The spring 62 biases a spring arm second end 64 against a surface of the outer body 16. The spring 62 coils around a spring seat 70. Spring arm first end 60 is biased to push the bearing axle 50 upwards along the slot 54 and therefore in to contact with a three lobe cam 76 as viewed in FIG. 2. A hydraulic lash adjuster (HLA) 80 can be arranged at a latch pin end of the SRFF 10 for accommodating lash.

Figure 5B:
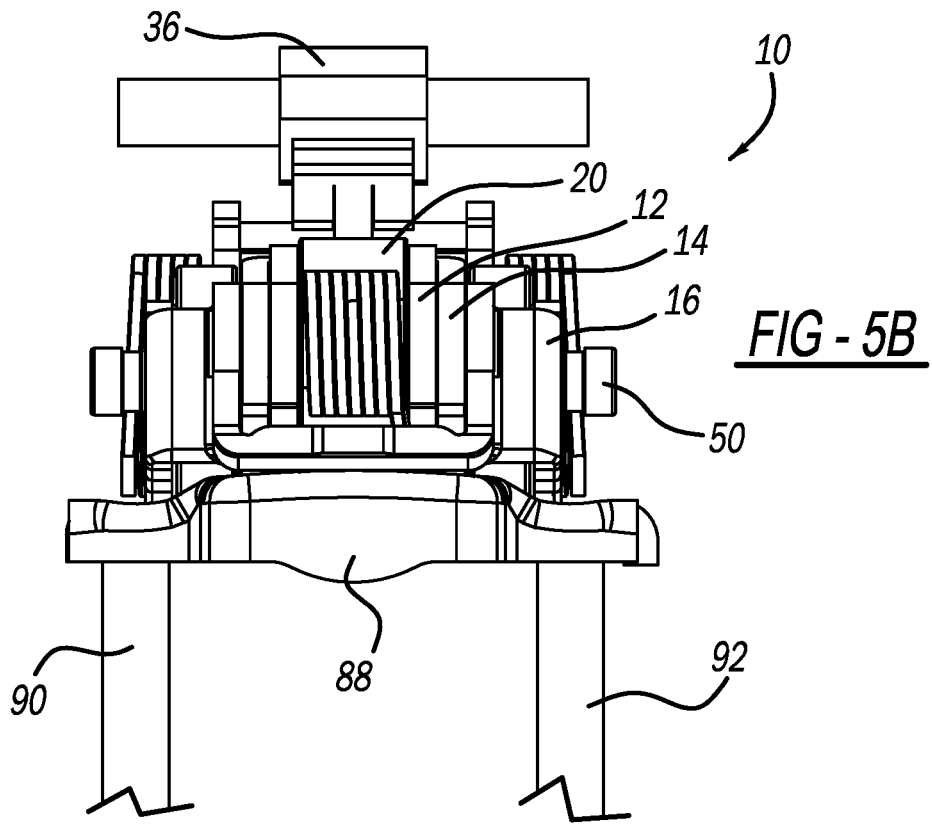
FIG. 5B is a front view of the single RRA of FIG. 5A.
Figure 5C:
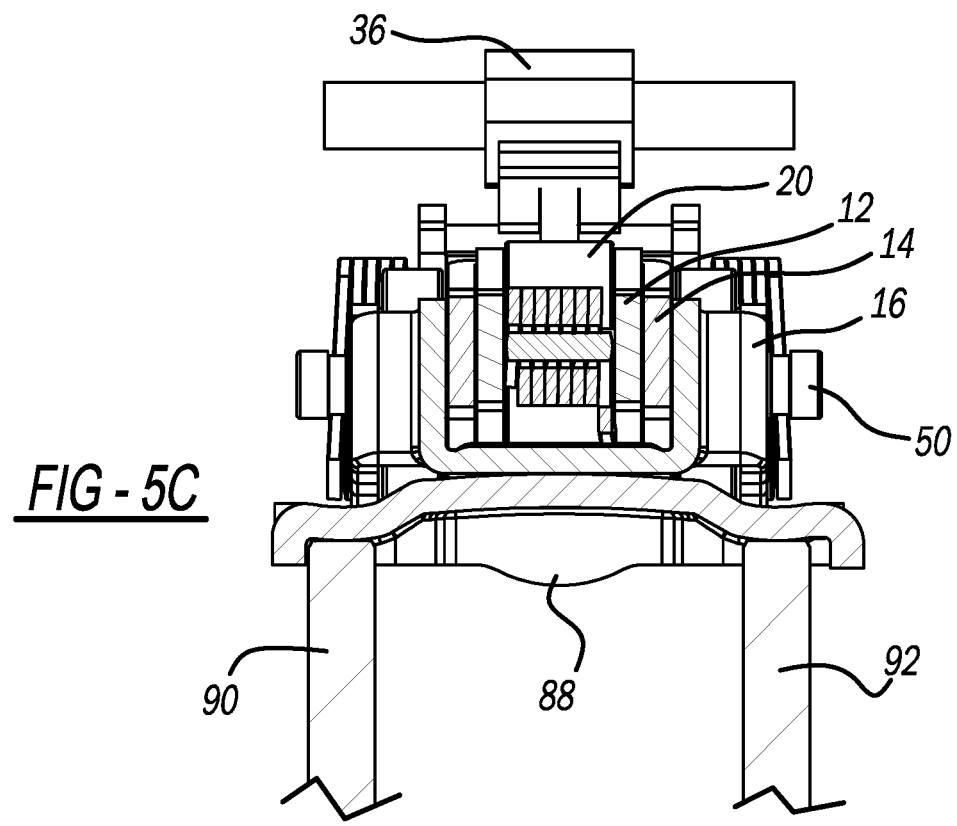
FIG. 5C is a sectional view of the RRA of FIG. 5A taken along lines 5C-5C of FIG. 5A.

With continued reference to FIGS. 4A-4E, various operating conditions of the SRFF 10 are shown. In particular, when the actuation (control) cam 36 is on base radius, latch pin 26 is fully engaged (FIG. 4A) and all of the first inner body 12, second inner body 14 and outer body 16 are latched. When the actuation cam 36 rotates to a lower lift (FIGS. 4B and 4C), the latch pin moves to a central position. During secondary lift, when the main lift inner body 12 is disengaged, the secondary lift inner body 14 remains engaged. As the actuation cam 36 rotates to a higher lift (FIGS. 4D and 4E), the latch pin 26 moves to a fully disengaged position. Valve deactivation occurs when both the first and second inner bodies 12 and 14 are disengaged. FIG. 5 illustrates a solution using the SRFF 10 with a valve bridge 88. The valve bridge 88 is engaged to valves 90 and 92. It will be appreciated that while the latch pin 26 is shown in this example as translating as a result of an electromechanical actuation, other configurations such as hydraulic systems and others are contemplated within the scope of the present disclosure.

Figure 6:
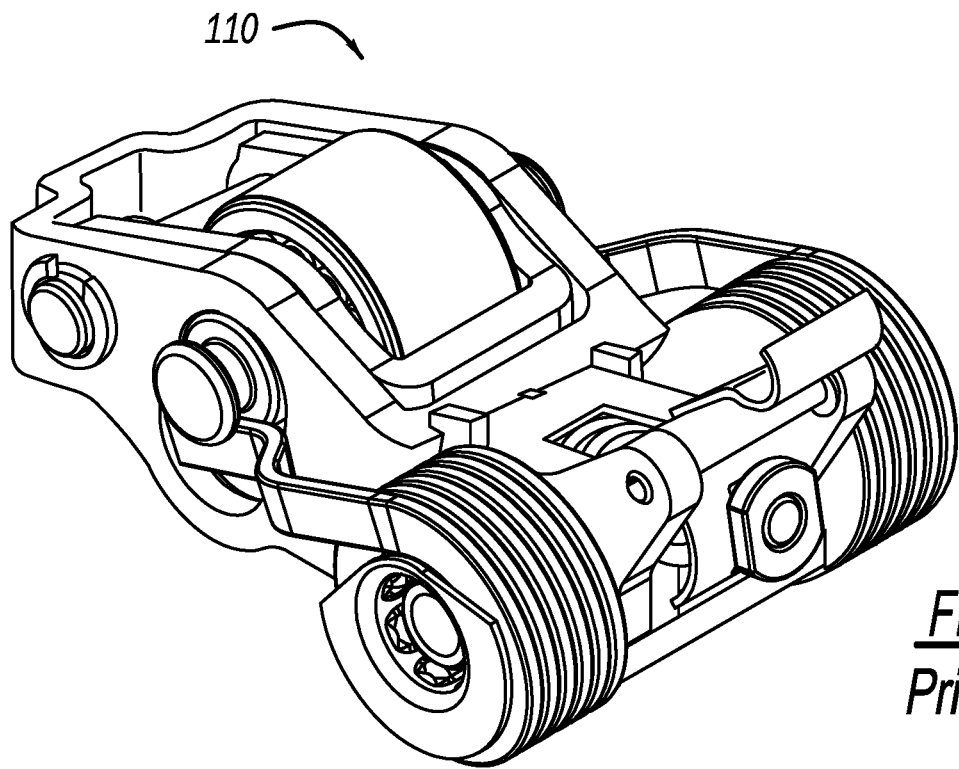
FIG. 6 is a perspective view of a SRFF having an outer arm investment cast according to one prior art example.
Figure 7:
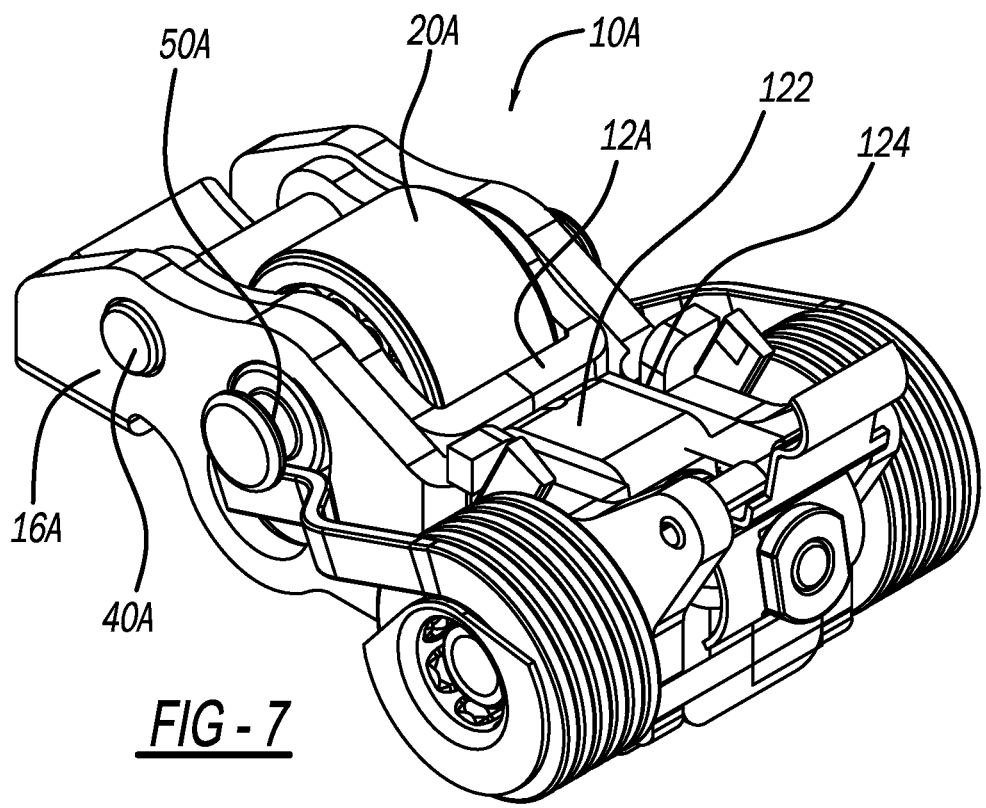
FIG. 7 is a perspective view of a SRFF having outer arms formed of stamping according to the present disclosure.

FIG. 6 is a perspective view of a SRFF 110 according to one prior art example. The SRFF 110 has outer arms 116 that are formed of investment casting. In comparison, the SRFF 10A in FIGS. 7 and 8 according to the present disclosure includes an outer arm 16A pivotally coupled to an inner arm 12A by a main axle 40A.

The SRFF 10A is a stamped sheet metal, single roller CDA rocker arm. The outer arm 16A of the SRFF 10A is formed of a stamped metal sheet. Similarly, an upper latch cavity member 122 and a lower latch cavity member 124, collectively comprising a latch cavity assembly 120 are also formed of metal stampings. In other features, the inner rocker arm 12A can also be formed of a metal stamping. A bearing axle 50A extends through the outer arm 16A and the inner arm 12A. The bearing axle 50A supports a roller 20A thereon. A latch pin 26A is slidably disposed in the outer arm 16A and is movable between at least a first position where the outer arm and the first inner arm are coupled for concurrent rotation and a second position where one of the outer arm and inner arm is configured to rotate relative to the other arm.

Figure 8:
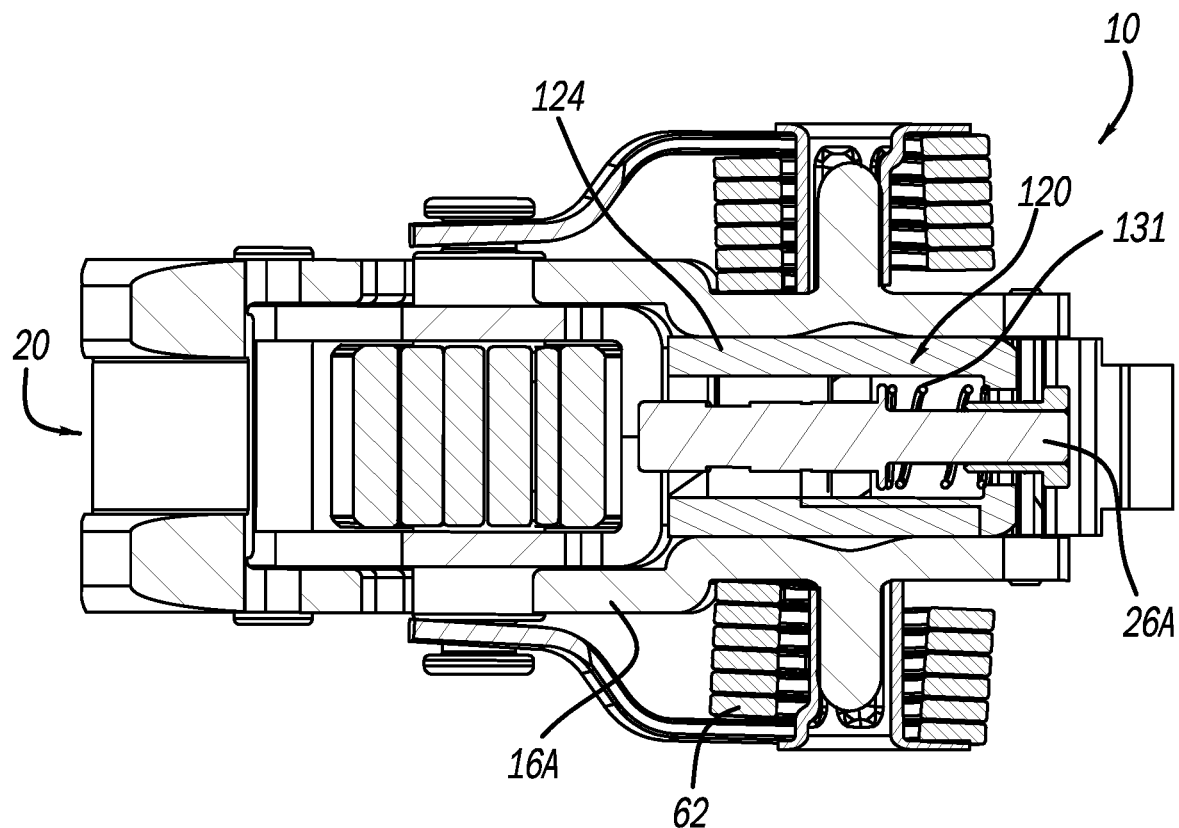
FIG. 8 is a sectional view taken through the latch pin of the SRFF of FIG. 7.
Figure 9A:
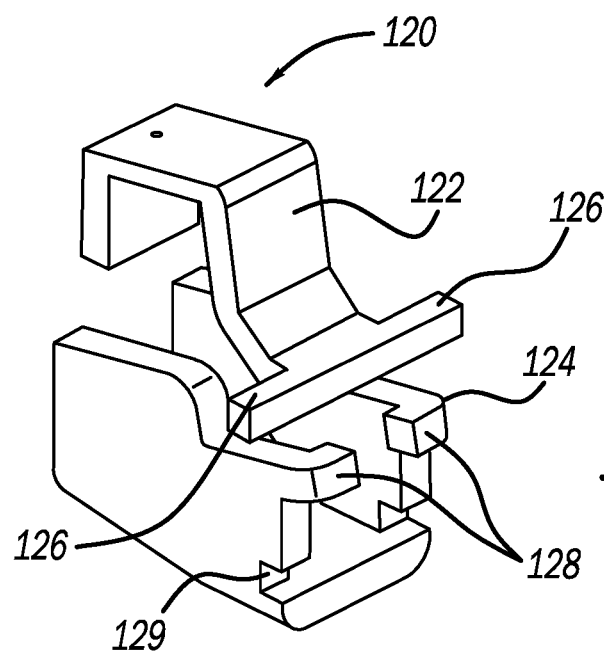

With reference to FIGS. 9A-12B, assembling of a latch cavity (inner) assembly 120 according to one example of the present disclosure is shown. The latch cavity assembly 120 generally includes the upper latch cavity member 122 and the lower latch cavity member 124. The upper latch cavity member 122 includes outwardly extending protrusions 126. The lower latch cavity member 124 includes inwardly extending fingers 128 and defines a notch 129. As best shown in FIG. 8, the fingers 128 can cooperate to retain features associated with the latch pin 26A, such as, but not limited to a latch spring 131. In some examples, a bore 133 (FIG. 15) is formed in the upper latch cavity member 122 to accommodate the latch pin 26A.

Figure 11A:
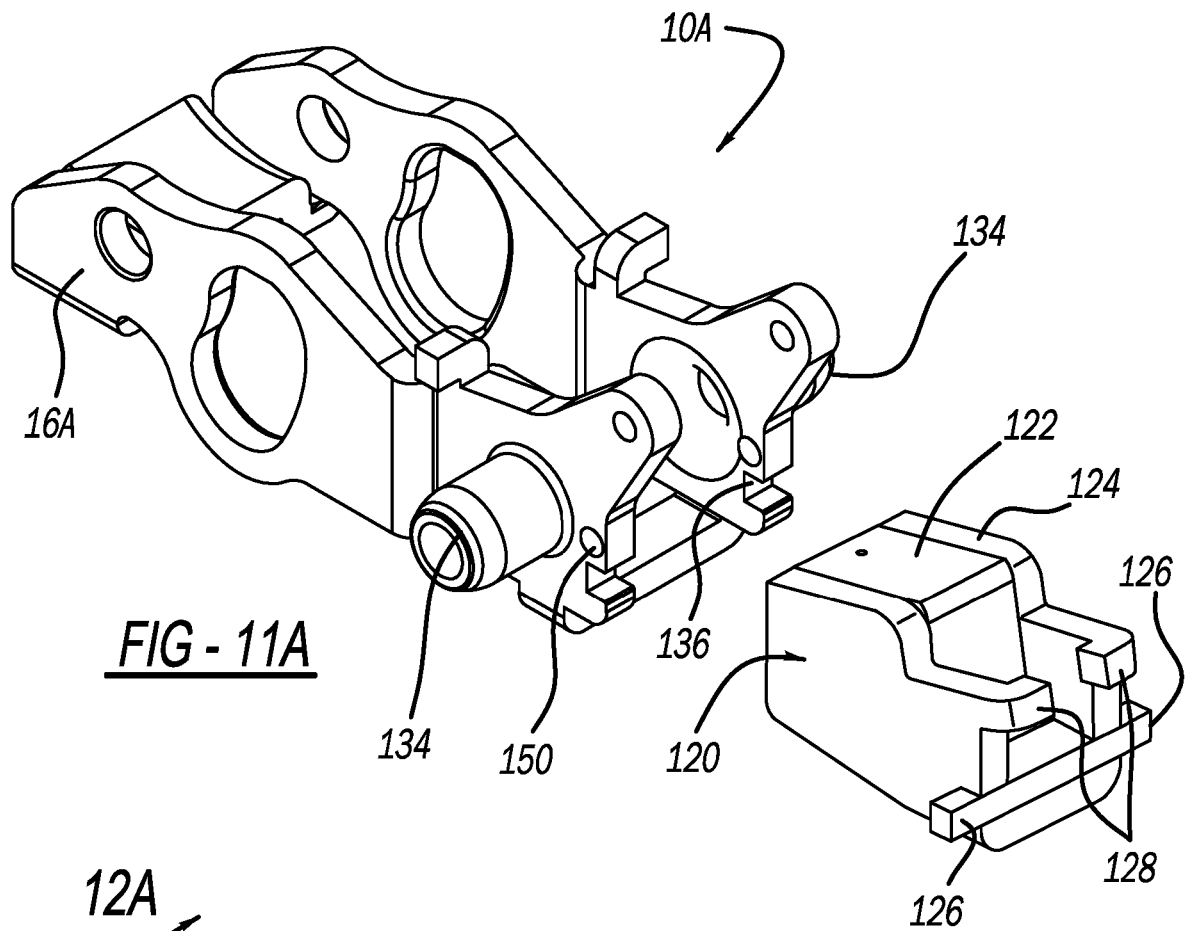
FIGS. 11A and 11B are a front perspective sequence illustrating assembling of the latch cavity assembly of FIG. 9B into the outer arm stamping.
Figure 11B:
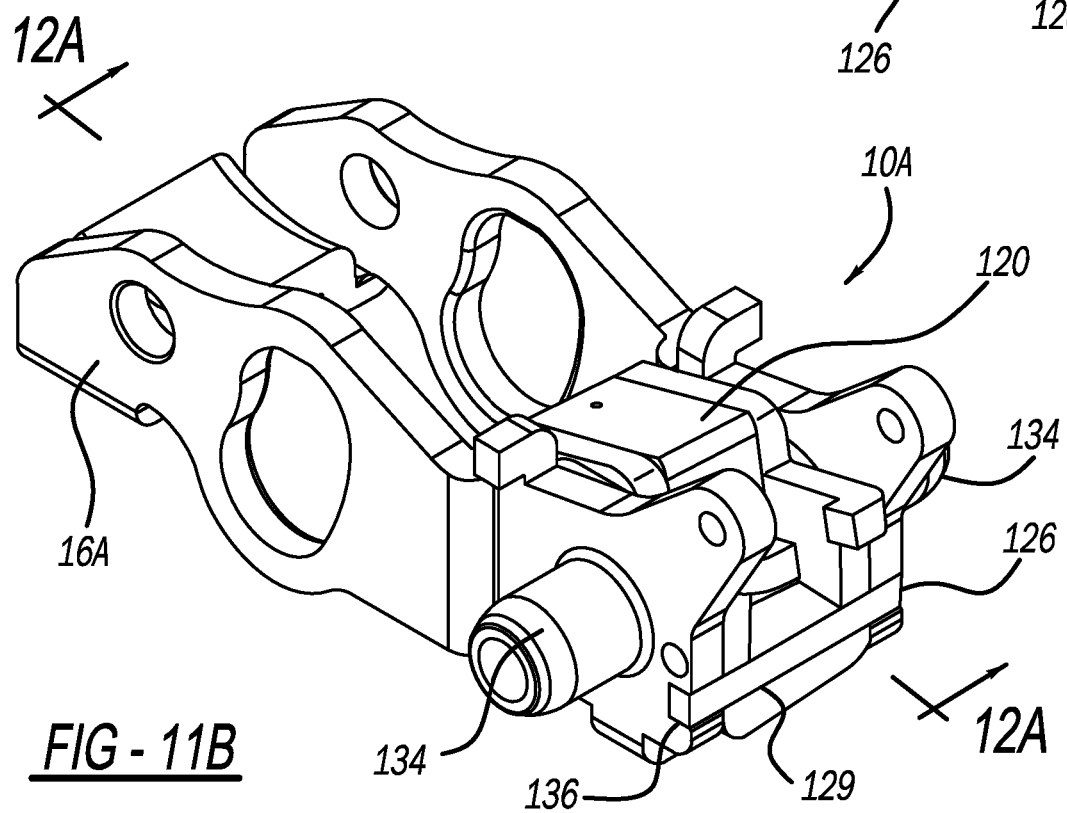

During assembly, the notch 129 of the lower latch cavity member 124 receives the outwardly extending protrusions 126 to positively locate the upper latch cavity member 122 relative to the lower latch cavity member 124. When assembled, the upper and lower latch cavity members 122, 124 form the latch cavity assembly 120. The upper and lower latch cavity members 122, 124 can be held together (sealed) by way of welding, brazing, bonding, staking or combinations thereof. Once the latch cavity or inner subassembly 120 is assembled, it is mounted into the outer arm stamping 16A (FIG. 11A-11B).

Figure 12A:
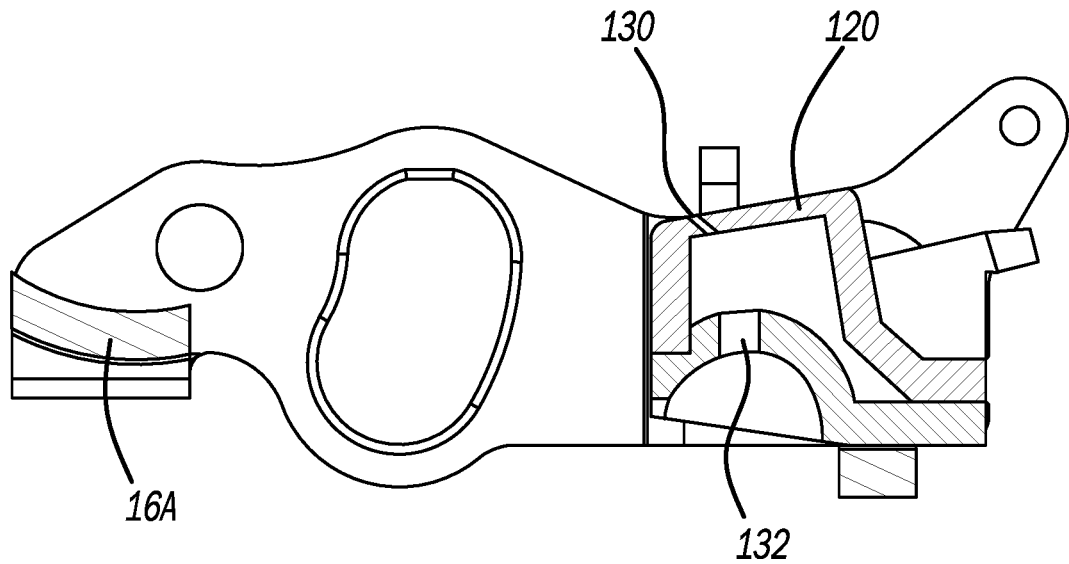
FIG. 12A is a sectional view taken along lines 12A-12A of FIG. 11B illustrating holes pierced in the stamping of the latch cavity assembly.
Figure 12B:
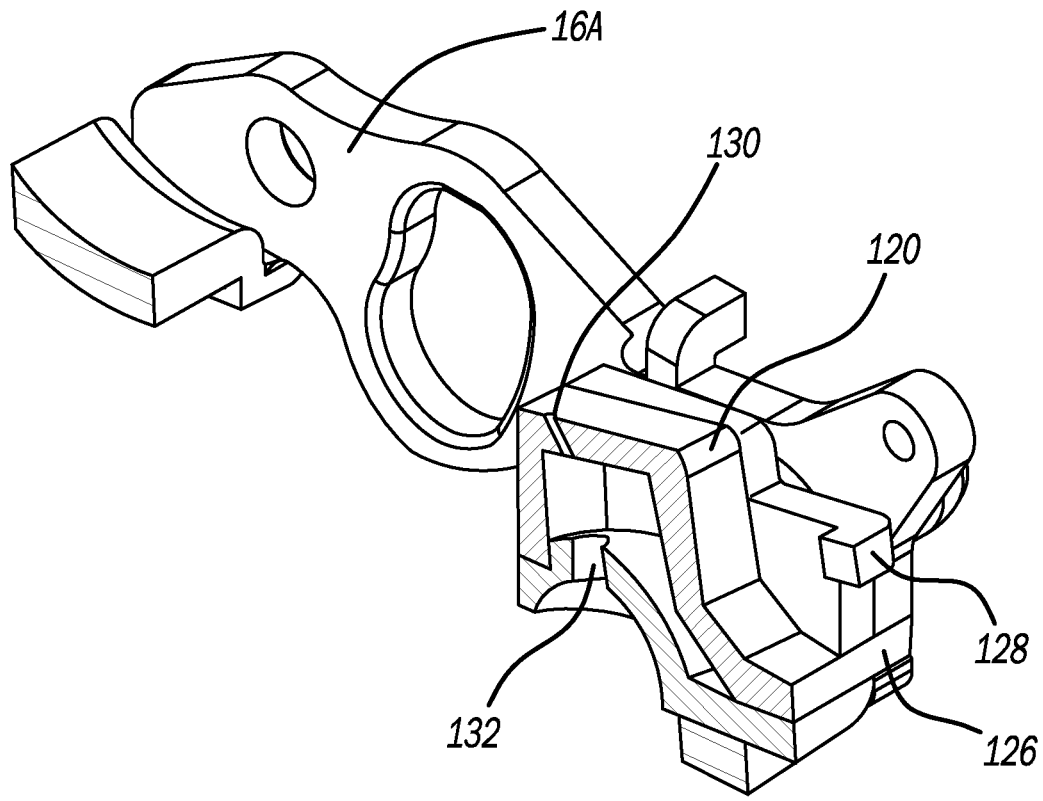
FIG. 12B is a perspective view of the rocker arm and latch cavity assembly of FIG. 12A.

The outer arm stamping 16A will be further described. The outer arm stamping 16A can be formed from a single section of sheet metal. In this regard, various stamping, forming and folding operations are carried out to arrive at the structure representing the outer arm stamping 16A. Notably, outwardly extending axles 134 are unitarily formed on the outer stamping 16A. The axles 134 can support springs 62A. A rocker arm notch 136 can be defined in the outer arm stamping 16A. The rocker arm notch 136 can receive the protrusions 126 of the upper latch cavity member 122 in an assembled position (FIG. 11B). The inner subassembly 120 can be merged with the outer arm stamping 16A by any suitable means such as, but not limited to, welding, chemical bonding or riveting. As shown in FIG. 12A, holes 130 and 132 are pierced into the outer arm stamping 16A. In some examples, the holes 130 and 132 can accommodate oil passage therethrough.

Figure 13:
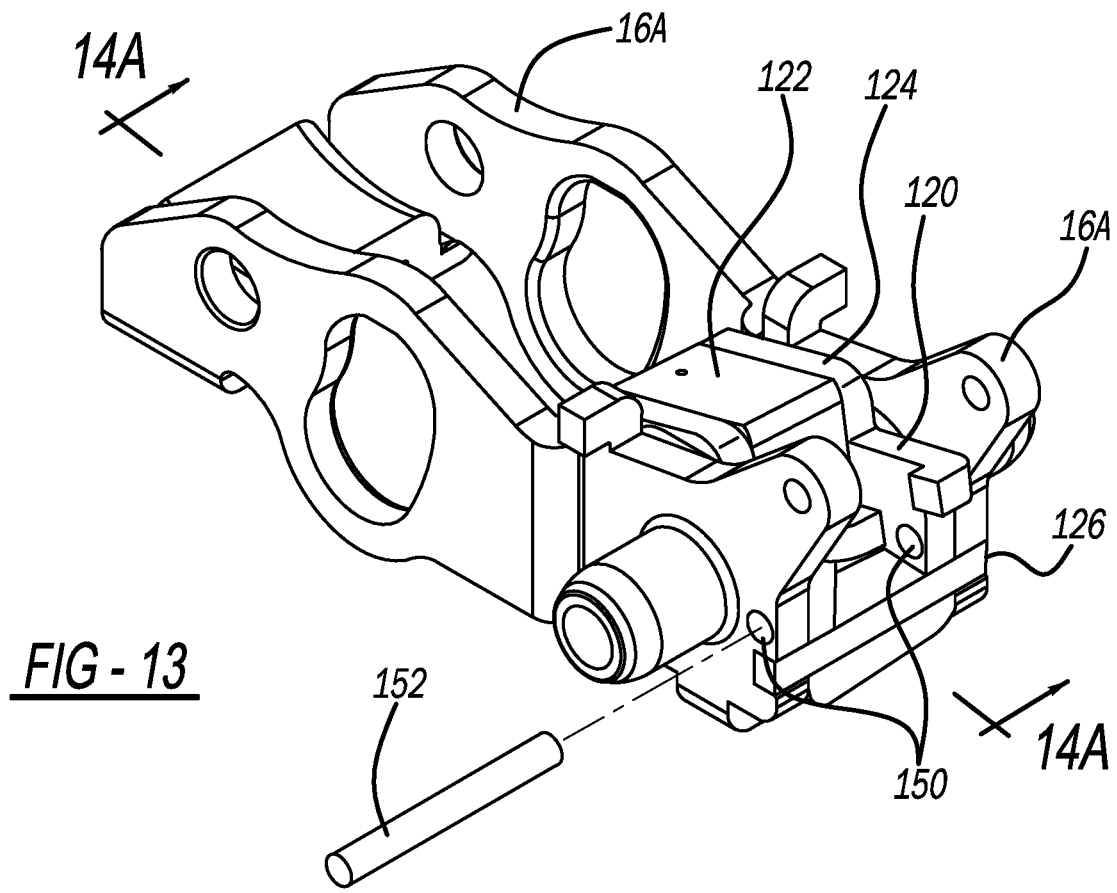
FIG. 13 is a perspective view of the SRFF illustrating formation of a hole and insertion of an axle subsequent to inserting the latch cavity assembly into the outer arm.
Figure 14A:
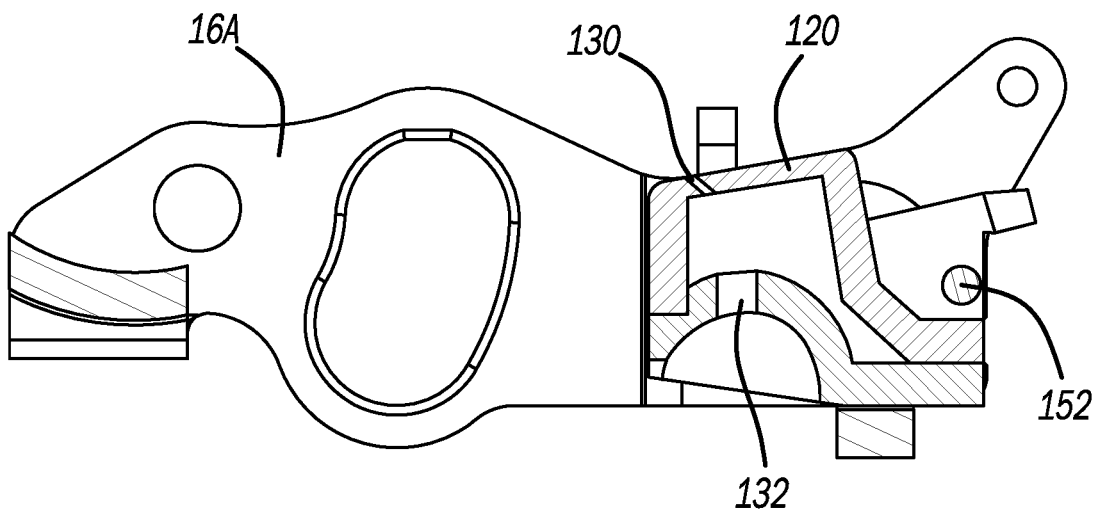
FIG. 14A is a sectional view taken along lines 14A-14A of the SRFF of FIG. 13.
Figure 14B:
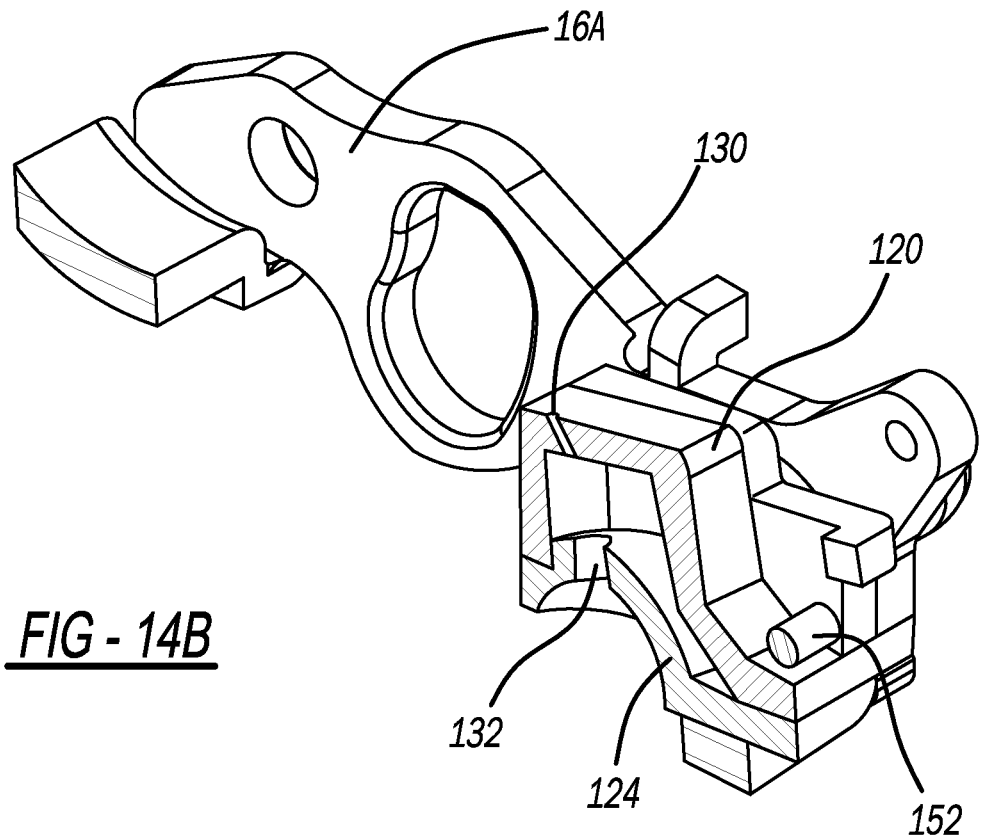
FIG. 14B is a perspective view of the rocker arm; latch cavity assembly and axle of FIG. 14A.
Figure 15:
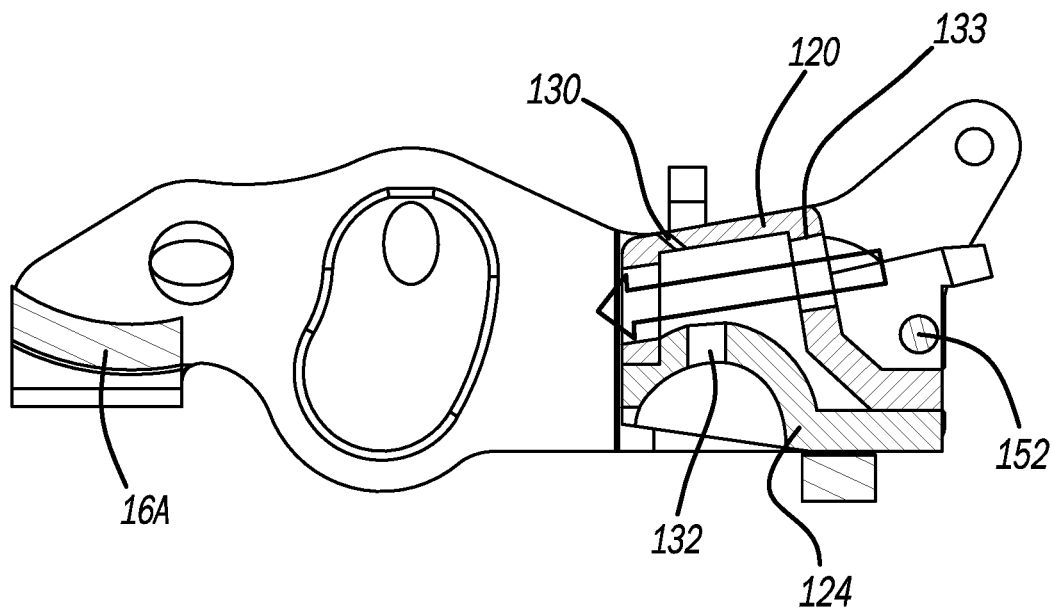
FIG. 15 illustrates a measurement step where the latch bore is measured as an assembly to maintain the relation between critical features of the SRFF.

[0064] Turning now to FIGS. 13-15, additional features of the instant application are shown. A hole 150 is machined through the outer stamped arm 16A and latch cavity assembly 120. An axle pin 152 is fed through the outer arm 16A and the latch cavity assembly 120. The axle pin 152 holds the whole unit together. Explained further, the axle pin 152 further retains the latch cavity assembly 120 to the outer arm stamping 16A. The axle pin 152 can be staked to maintain a fixed position relative to the outer stamped arm 16A. Formation of the bore 133 is also shown in FIG. 15.

Figure 16:
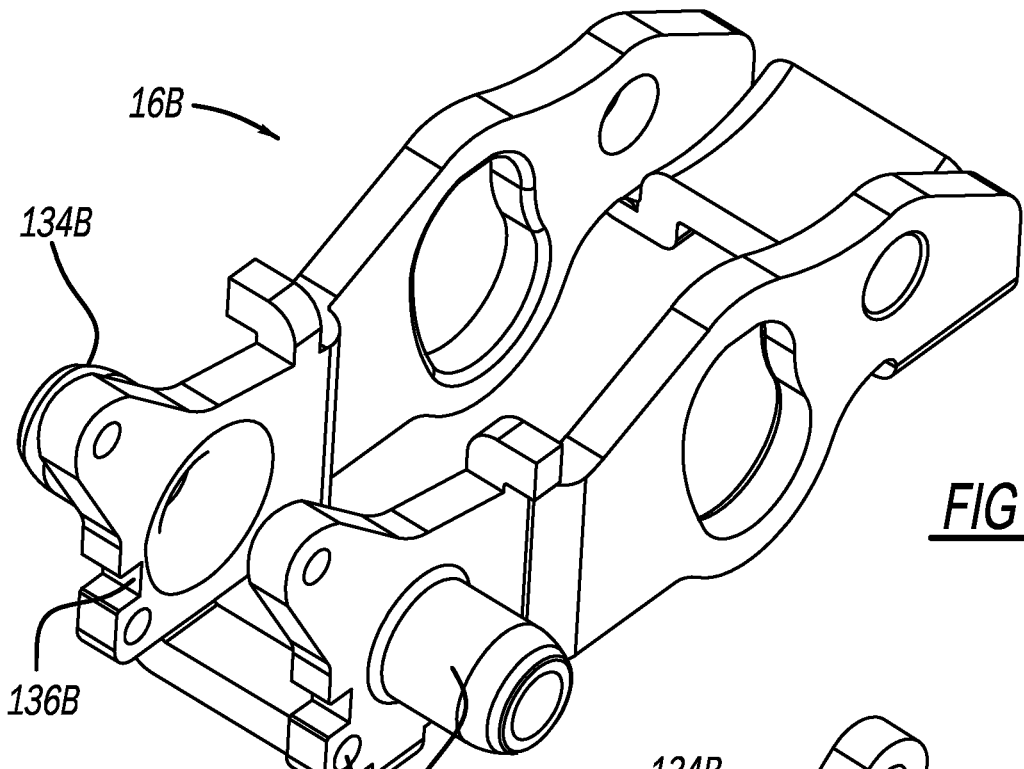
FIG. 16 is a first perspective view of a stamped outer arm of a SRFF according to one example of the present disclosure.
Figure 17:
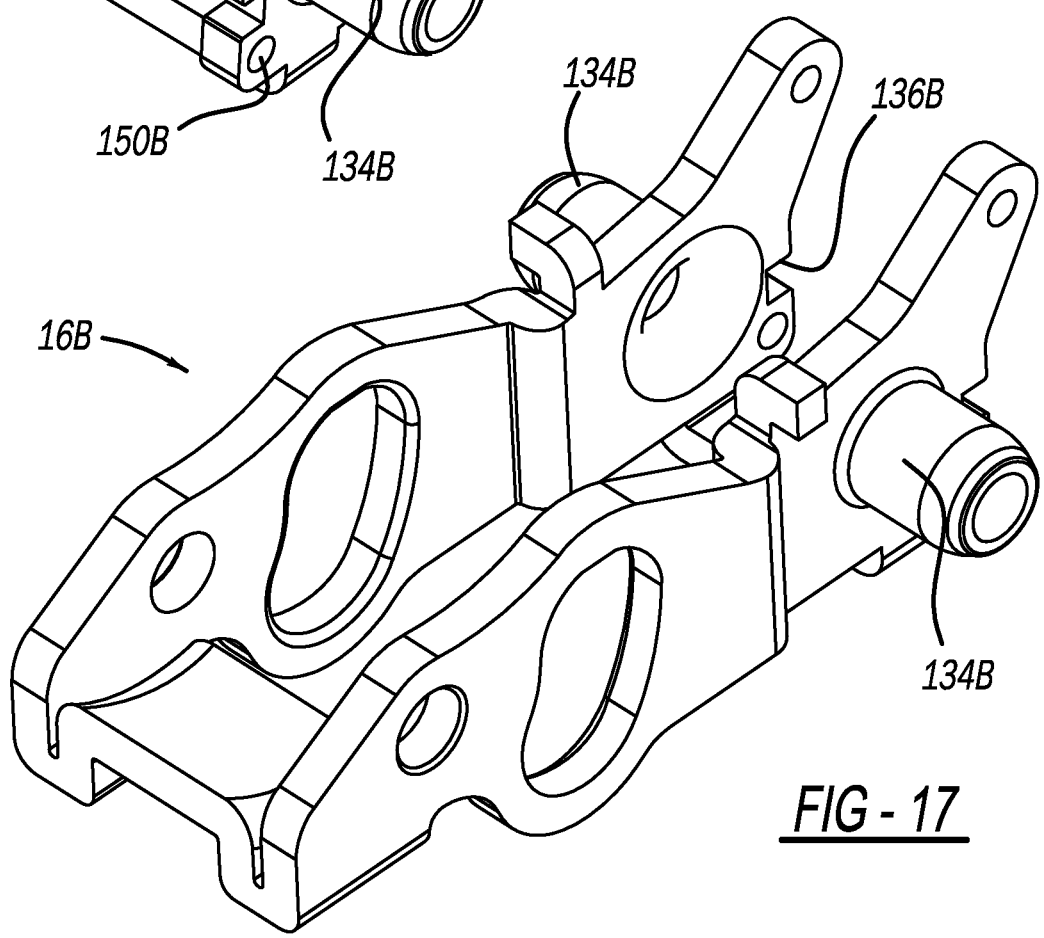
FIG. 17 is a second perspective view of the stamped outer arm of FIG. 16.
Figure 18:
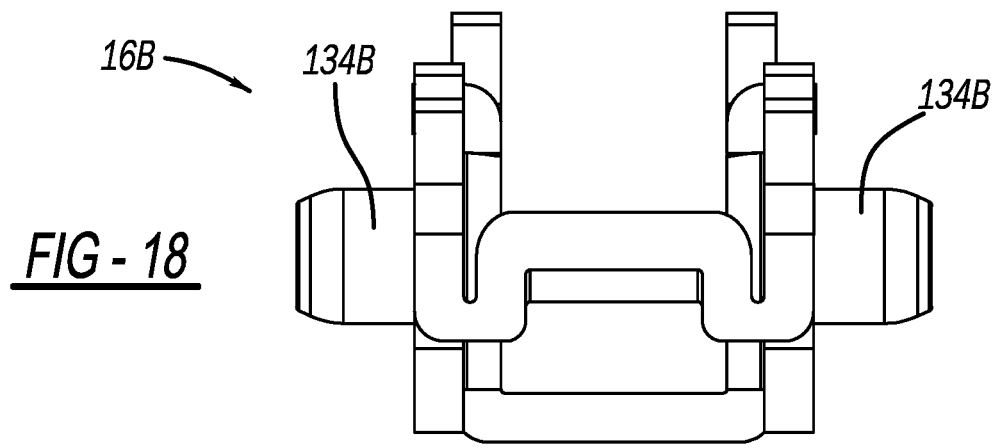
FIG. 18 is a front view of the stamped outer arm of FIG. 16.
Figure 19:
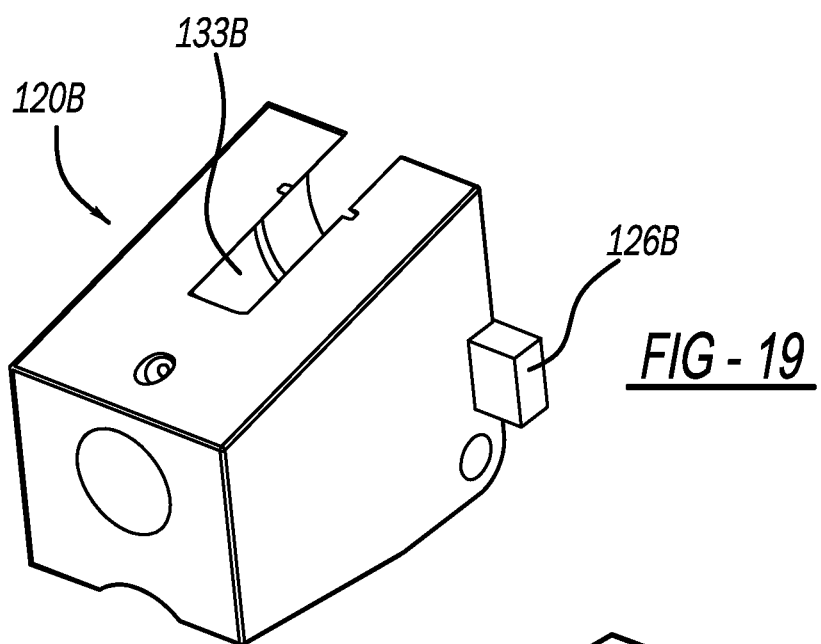
FIG. 19 is a front perspective view of a latch cavity assembly according to another example of the present disclosure.
Figure 20:
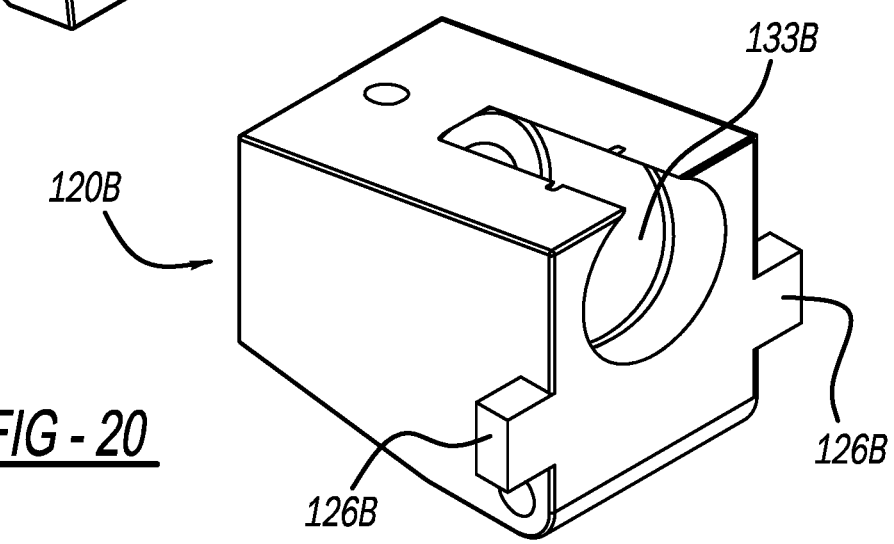
FIG. 20 is a rear perspective view of the latch cavity assembly of FIG. 19.
Figure 21:
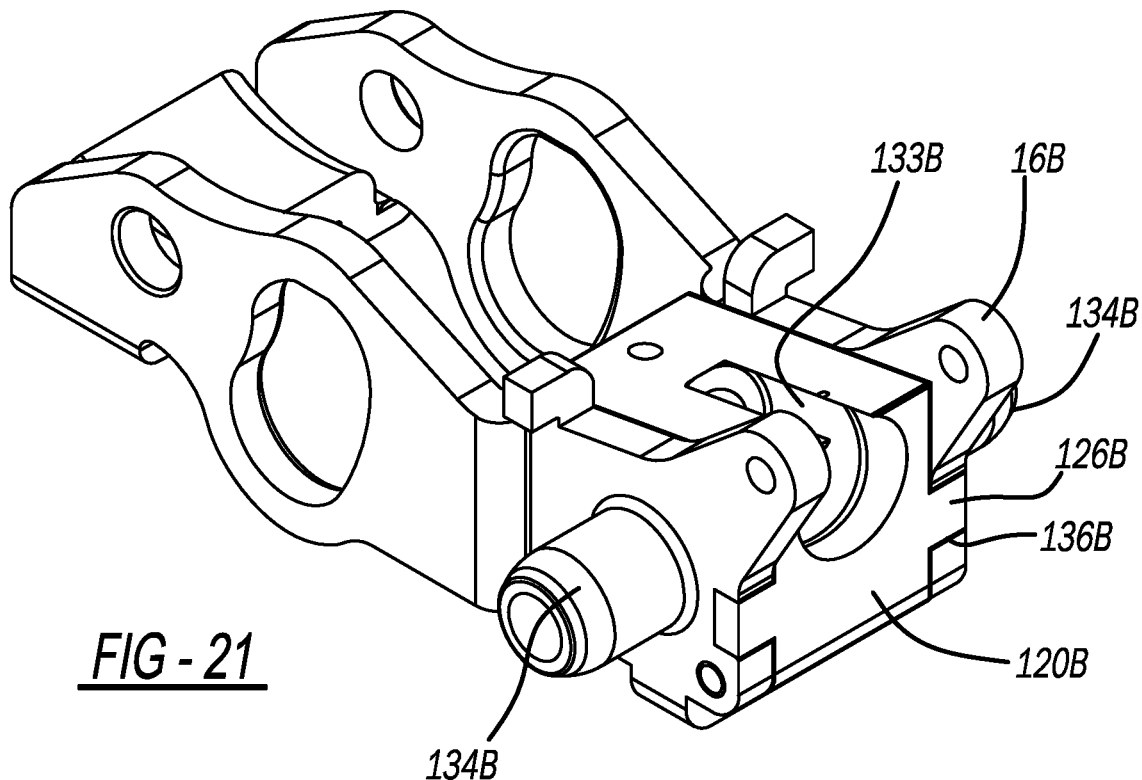
FIG. 21 is a rear perspective view of a SRFF including the stamped outer arm of FIG. 16 and latch cavity assembly of FIG. 19.
Figure 22:
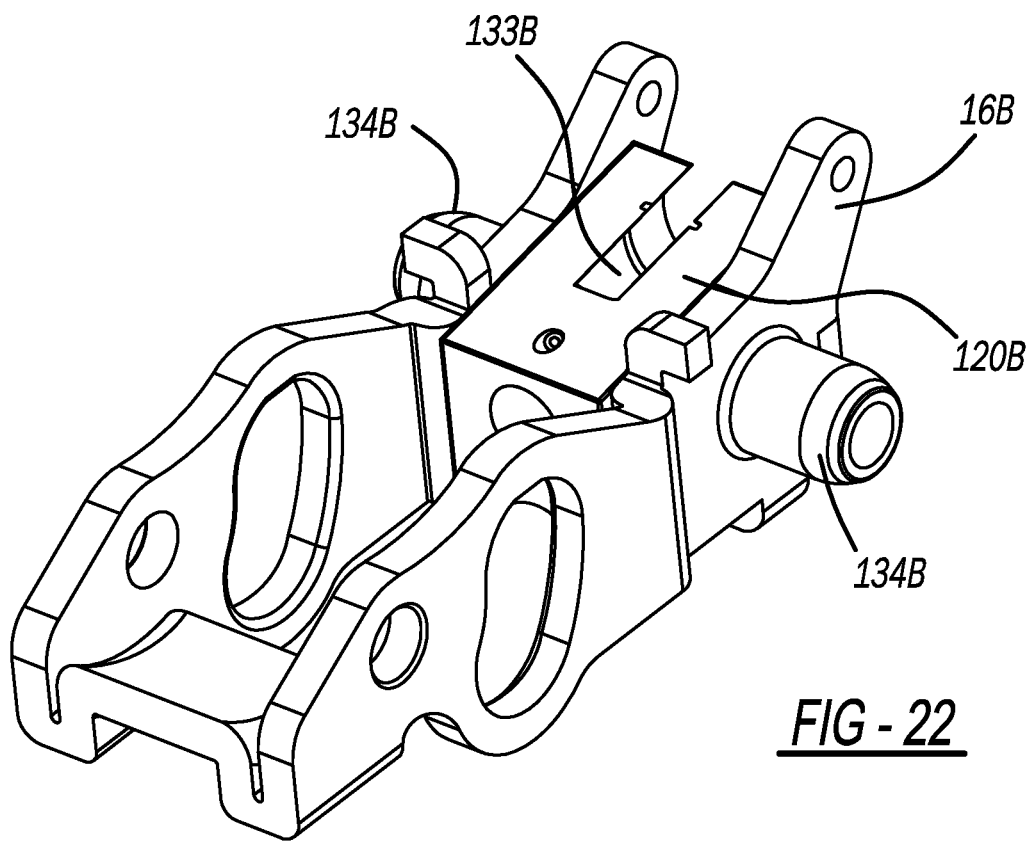
FIG. 22 is a front perspective view of the SRFF of FIG. 21.

FIGS. 16-18 illustrate an outer stamped arm 16B constructed according to additional features of the instant application. The outer stamped arm 16B can be configured similarly to the outer stamped arm 16A described above. Like reference numerals using a "B" suffix have been used to denote similar features. FIGS. 19 and 20 illustrate a latch cavity assembly or inner subassembly 120B according to additional features of the instant application. The latch cavity assembly 120B can be formed from a single stamping. The latch cavity assembly 120B includes protrusions 126B that are configured to locate within the notch 136B of the outer stamped arm 16A. A bore 133B is formed in the latch pin cavity assembly 120B for accommodating features of a latch pin assembly (not shown). FIGS. 21 and 22 illustrate the latch cavity assembly 120B coupled to the outer stamped arm 16B.

Figure 23:
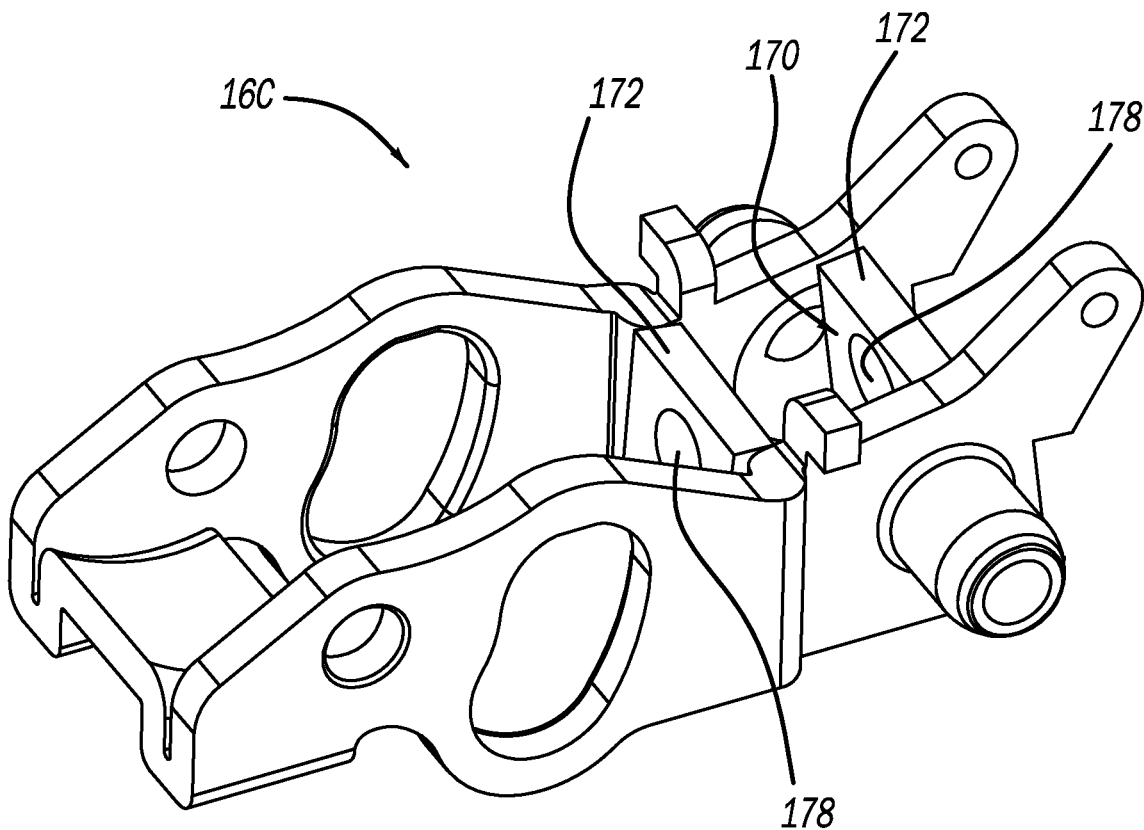
FIG. 23 is a front perspective view of a stamped outer arm of a SRFF constructed in accordance to another example of the present disclosure.
Figure 24:
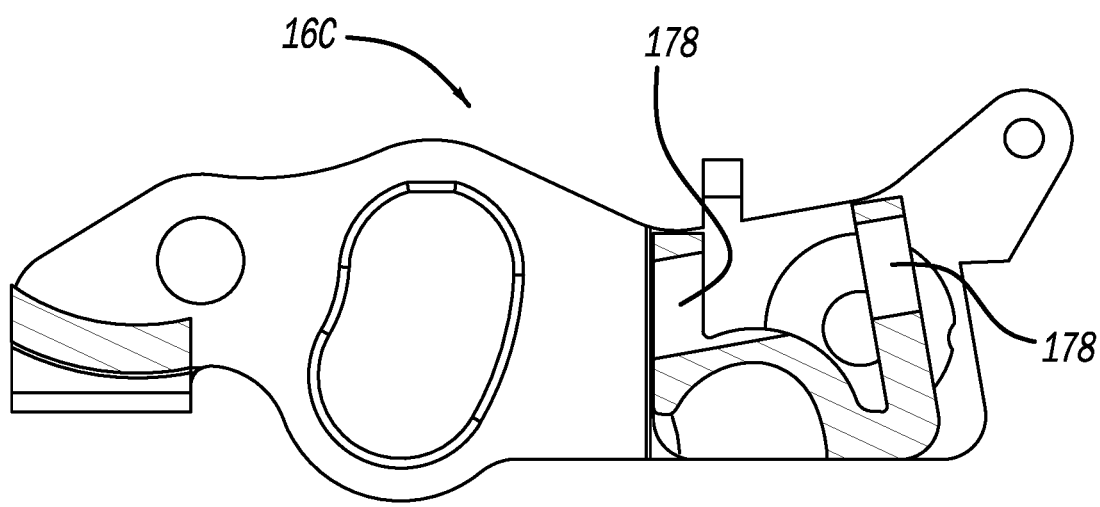
FIG. 24 is a side view of the stamped outer arm of FIG. 23.
Figure 25:
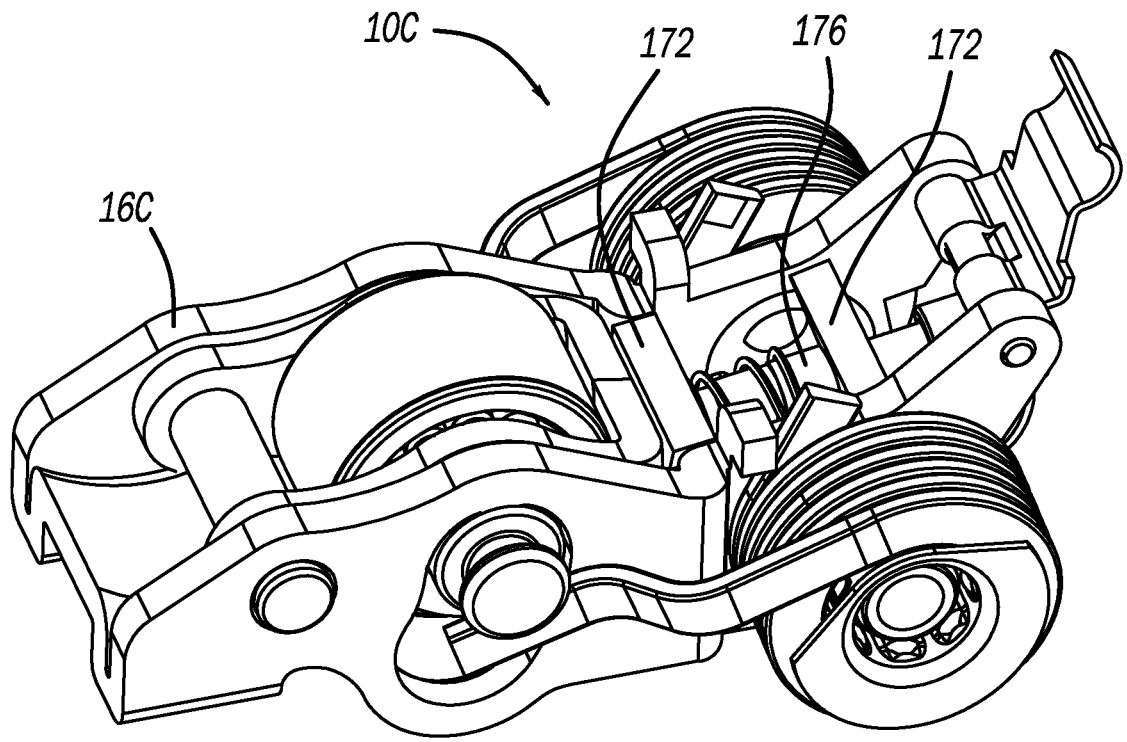
FIG. 25 is a perspective view of a SRFF constructed in accordance to one example of the present disclosure and having the stamped outer arm of FIG. 23.

FIGS. 23 and 24 illustrate an outer stamped arm 16C constructed according to additional features of the instant application. The stamped arm 16C includes a latch housing 170 integrally formed by the stamped rocker arm 16C. Explained further, the stamped rocker arm 16C, like the other stamped rocker arms disclosed herein is formed from a series of stamping, forming, folding and joining steps. The stamped rocker arm 16C includes box walls 172 that are folded and formed from the stamped metal sheet. In some examples, the box walls 172 can be subsequently secured, such as by welding to the outer walls of the stamped rocker arm 16C after being folded into the position shown in FIG. 23. FIG. 25 illustrates a SRFF 10C constructed in accordance to another example of the instant application and including the outer stamped arm 16C. The SRFF 10C includes a latch 176 that is accommodated through passages 178 formed in the box walls 172 of the latch housing 170.

Turning now to FIGS. 26A-28B, additional features of the instant application will be described. FIGS. 26A-26D illustrates a stamped outer arm 16D moving along an assembly line. At 210, pad, holes and room for an ogive insert are completed. At 212, the stamped outer arm 16D is placed into a fixture 190 with precise references. A sphere 170 enters in a larger hole into the outer arm 16D (thus giving no positioning to the outer arm 16D). An ogive insert 172 comes from the top. The insert 172 can accommodate a latch. The ogive insert 172 is driven in the right position and further translation during the driving step is stopped and controlled by the sphere 170. Clearances within the outer arm 16D allow for this. When the insert 172 is in the correct position, upper portions 194 of the outer arm 16D are bent to lock the insert 172. As shown in FIG. 27B, the ogive insert 172 cannot rotate.

Figure 26A:
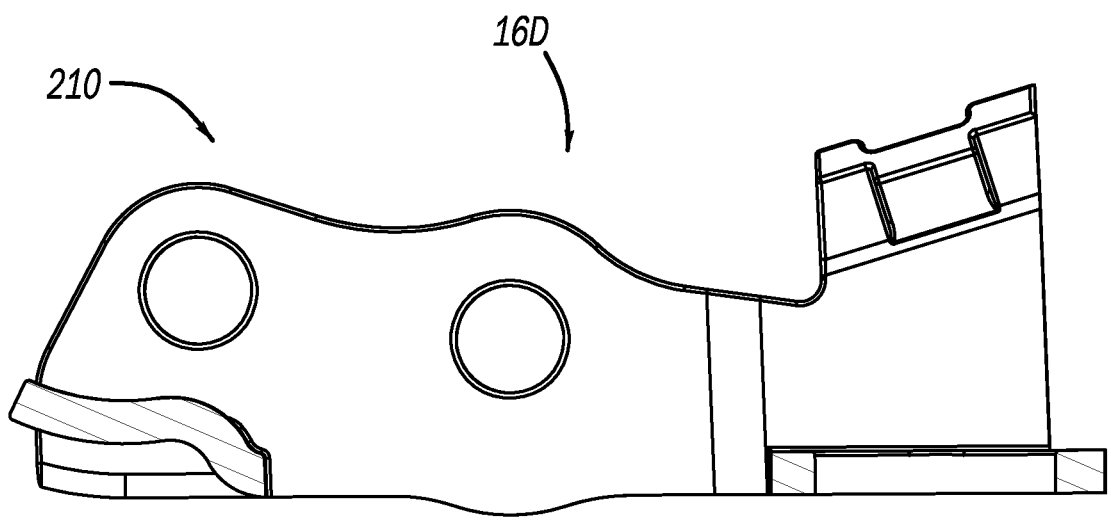
FIG. 26A is a side view of a stamped outer rocker arm during a first assembly step.
Figure 26B:
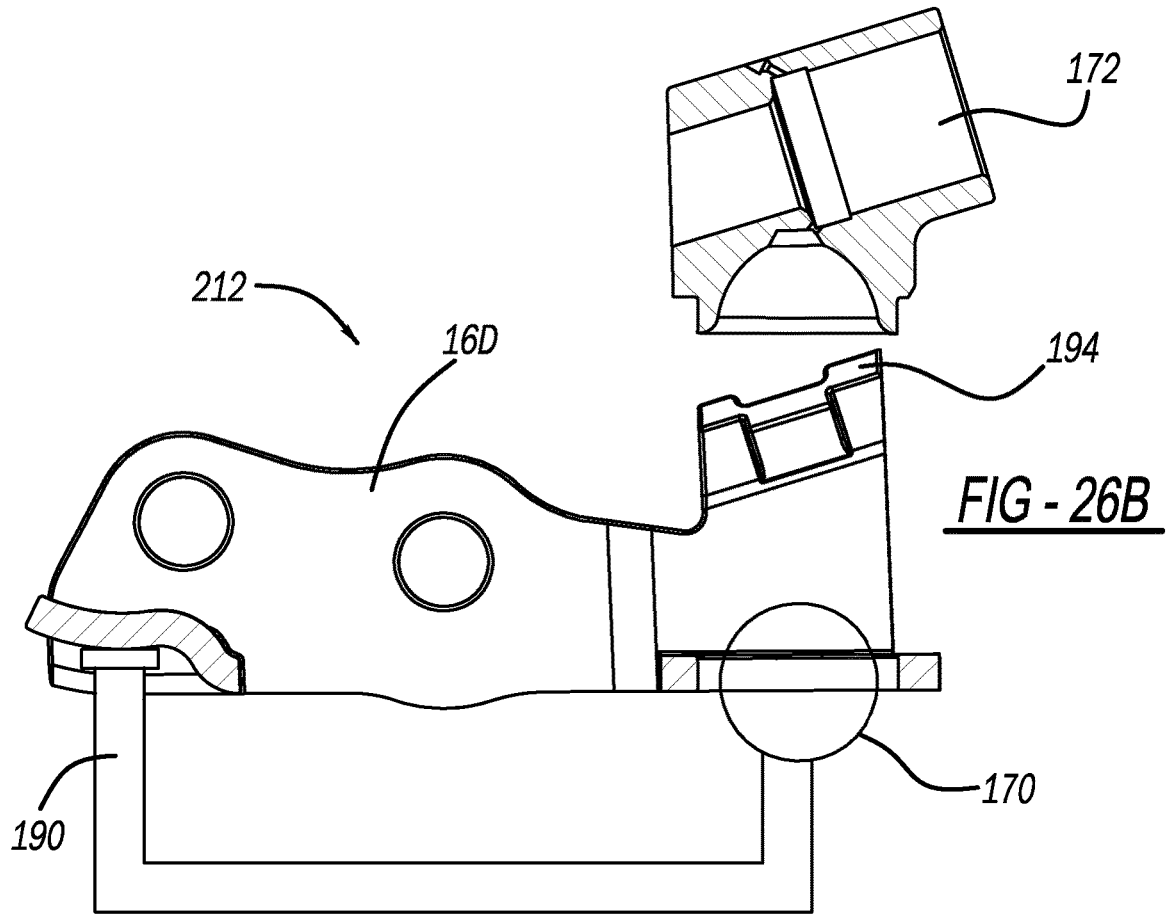
FIG. 26B is an exploded view of a stamped outer rocker arm placed into a fixture and shown with an insert positioned above, wherein a sphere is positioned for receipt of the insert.
Figure 26C:
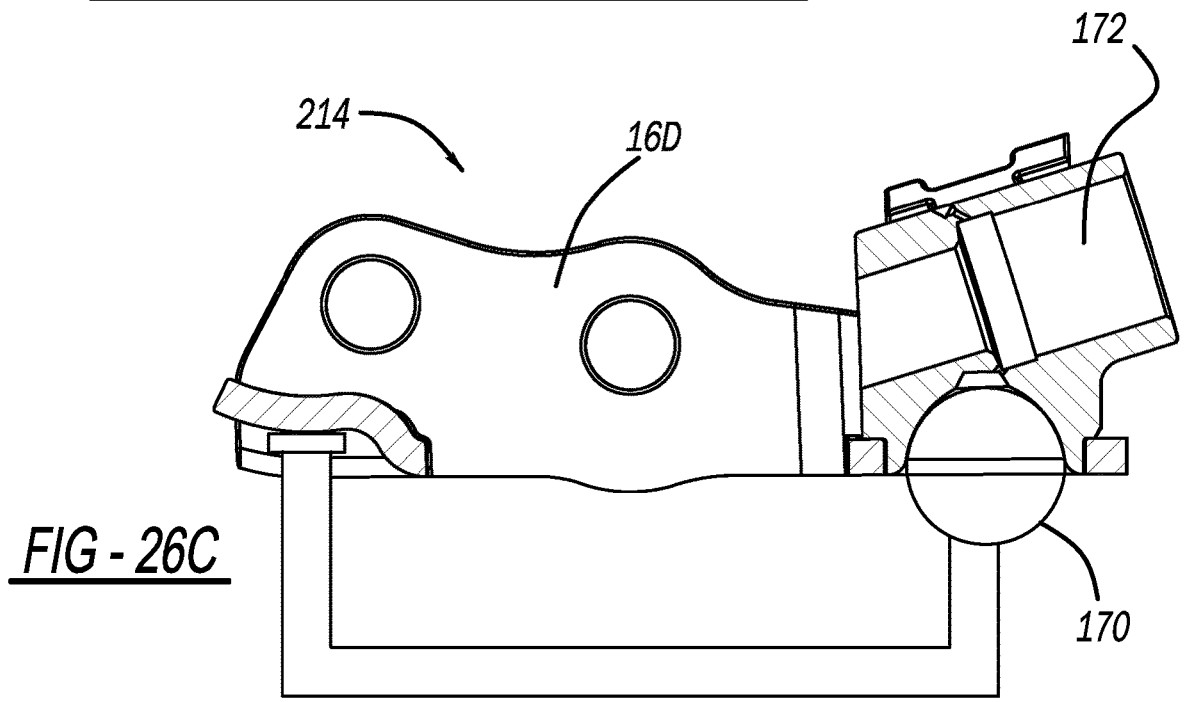
FIG. 26C is a side view of the stamped outer rocker arm subsequent to the insert being driven into the desired location controlled by the sphere.
Figure 26D:
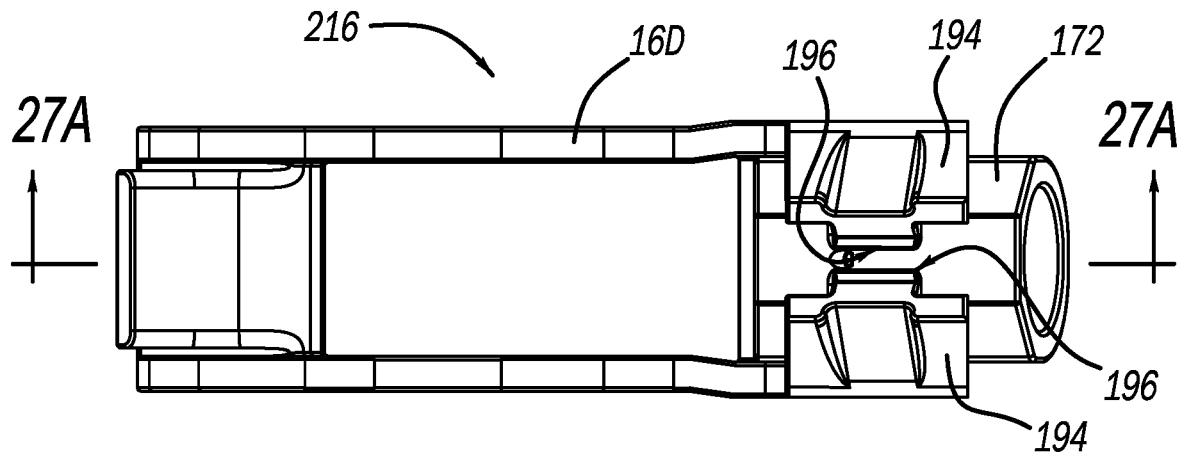
FIG. 26D is a top view of the stamped outer rocker arm and insert assembly.
Figure 26E:
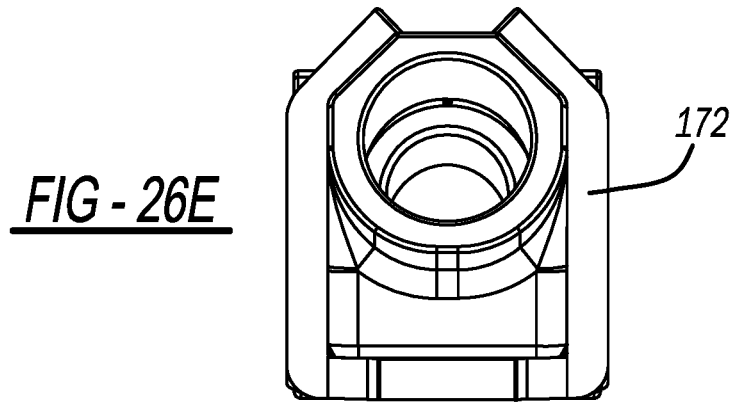
FIG. 26E is a rear view of the stamped outer rocker arm and insert assembly of FIG. 26D.
Figure 27A:
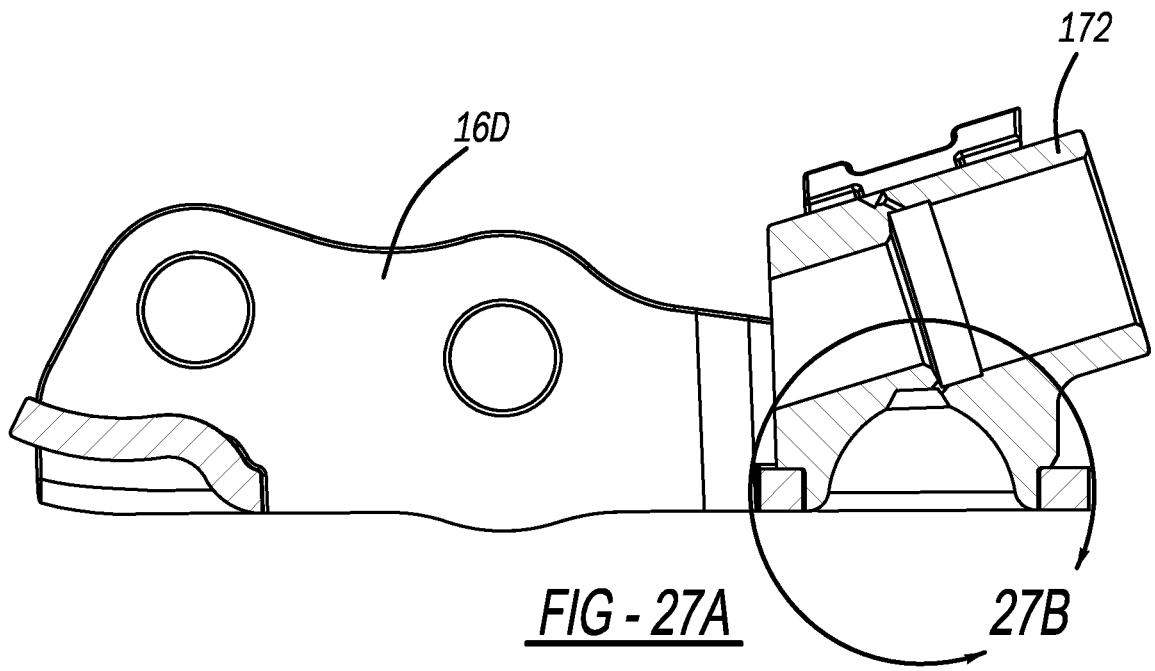
FIG. 27A is a sectional view taken along lines 27A-27A of FIG. 26D.

As shown in FIGS. 28A and 28B, pockets 180 on the insert 172 allow material from the upper portions 194 of the outer arm 16D to flow inside. They constrain the ogive insert 172 in the proper position. In addition to bending, laser welding (or other welding) may be performed at interface 196 (FIG. 26D). The configuration shown in FIGS. 26D-27B provides precise control of the interaxes between the ogive center and the valve pad center. Only one component is needed to realize the ogive as opposed to two needed in prior art examples. In this example, it is not necessary to seal the ogive as it is realized inside the ogive insert. The instant manufacturing process requires low numbers of manufacturing steps to achieve the stamped outer arm.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present disclosure illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A switching roller finger follower (SRFF) for valve actuation, the SRFF comprising:
   an outer arm pivotally coupled to a main axle;
   a first inner arm coupled to the main axle and pivotally secured to the outer arm;
   a bearing axle extending through the outer arm and the first inner arm, the bearing axle supporting a roller;
   a latch pin slidably disposed in the outer arm, the latch pin configured to switch between at least a first position in which the outer arm and the first inner arm are rotationally coupled to each other, and a second position in which the outer arm and the first inner arm are rotationally decoupled from each other; and a latch cavity assembly coupled to the outer arm, the latch cavity assembly including an upper latch cavity member coupled to a lower latch cavity member, wherein the outer arm is formed of a metal stamping.

2. The switching roller finger follower of claim 1 wherein the upper latch cavity member and lower latch cavity member are formed of a metal stamping.

3. The switching roller finger follower of claim 2 wherein the upper latch cavity member includes outwardly extending protrusions, and wherein the lower latch cavity member defines a cavity notch configured to receive the outwardly extending protrusions.

4. The switching roller finger follower of claim 3 wherein the outer arm defines a rocker arm notch, and wherein the outwardly extending protrusions are further received by the rocker arm notch.

5. The switching roller finger follower of claim 1 wherein the latch cavity assembly is coupled to the outer arm via at least one of welding, chemical bonding and riveting.

6. The switching roller finger follower of claim 1 wherein the upper latch cavity member is coupled to the lower latch cavity member via at least one of welding, brazing, bonding, and staking.

7. The switching roller finger follower of claim 1, further comprising:

an axle pin received within complementary holes formed in the outer arm and the latch cavity assembly, the axle pin coupling the latch cavity assembly to the outer arm.

8. The switching roller finger follower of claim 7 wherein the axle pin is fixed to the outer arm via a staking.

9. The switching roller finger follower of claim 1 wherein the outer arm defines integrally formed axles configured to support springs.

10. The switching roller finger follower of claim 1 wherein the latch cavity assembly is formed of a single stamping.

11. The switching roller finger follower of claim 1 wherein the outer arm defines a latch housing integrally formed by the metal stamping, the latch housing including box walls defining at least one passage that accommodates the latch pin.

12. The switching roller finger follower of claim 1 wherein the roller is an only roller on the SRFF, the roller configured to engage a single cam.

13. The switching roller finger follower of claim 12 wherein the SRFF is configured for cylinder deactivation.

14. The switching roller finger follower of claim 13 wherein the SRFF is further configured for variable valve lift.

15. A switching roller finger follower (SRFF) for valve actuation, the SRFF comprising:

an outer arm pivotally coupled to a main axle;

a first inner arm and a second inner arm each coupled to the main axle and pivotally secured to the outer arm;

a bearing axle extending through the outer arm, the first inner arm, and the second inner arm; and a latch pin slidably disposed in the outer arm, the latch pin configured to switch between at least (i) a first position in which the outer arm, the first inner arm, and the second inner arm are rotationally coupled to each other, and (ii) a second position in which the outer arm, the first inner arm, and the second inner arm are rotationally decoupled from each other;

wherein the outer arm is formed of a metal stamping, wherein the first inner arm is configured to control a main lift event via a single main roller, and the second inner arm is configured to control a secondary lift via two secondary rollers, and wherein each roller is supported on the bearing axle.

16. A method of forming an outer rocker arm of a switching roller finger follower (SRFF), the method comprising:

stamping sheet metal into a first shape having a rocker arm structure;

locating the stamped sheet metal into a fixture such that the rocker arm structure is supported in at least two locations in which one of the at least two locations includes a sphere;

locating an insert into the rocker arm structure against the sphere, the insert configured to accommodate a latch; and deflecting portions of the rocker arm structure at least partially over the insert thereby locking the insert relative to the rocker arm structure.

17. The method of claim 16 wherein the insert defines pockets, and wherein the deflecting of the portions of the rocker arm structure includes deflecting the sheet metal into the pockets.

18. The method of claim 17, further comprising:

welding the insert to the rocker arm structure subsequent to the locating of the insert into the rocker arm structure.

* * * * *